United States Patent

Suzuki

[11] Patent Number: 5,970,047
[45] Date of Patent: Oct. 19, 1999

[54] COMMUNICATIONS METHOD, COMMUNICATION APPARATUS, RECEPTION METHOD, AND RECEPTION APPARATUS

[75] Inventor: Mitsuhiro Suzuki, Chiba, Japan

[73] Assignee: Sony Corporation, Tokyo, Japan

[21] Appl. No.: 08/863,865

[22] Filed: May 27, 1997

[30] Foreign Application Priority Data

May 27, 1996 [JP] Japan .................................. 8-132437

[51] Int. Cl.$^6$ ........................................... H04J 4/00
[52] U.S. Cl. ............................. 370/210; 370/343
[58] Field of Search .................... 370/319, 334, 370/480, 481, 540, 204, 206, 210, 321, 337, 344, 345, 347, 203, 479, 343; 375/260, 261, 283, 298

[56] References Cited

U.S. PATENT DOCUMENTS

| | | | |
|---|---|---|---|
| 5,134,464 | 7/1992 | Basile et al. .............................. | 348/487 |
| 5,291,289 | 3/1994 | Hulyalkar ................................ | 375/261 |
| 5,452,322 | 9/1995 | Lauer ...................................... | 375/330 |
| 5,479,447 | 12/1995 | Chow et al. ............................. | 375/260 |
| 5,504,775 | 4/1996 | Chouly .................................... | 370/210 |
| 5,506,903 | 4/1996 | Yamashita ............................... | 370/465 |
| 5,541,552 | 7/1996 | Suzuki et al. ............................ | 375/326 |
| 5,570,350 | 10/1996 | Myer et al. .............................. | 370/335 |
| 5,680,388 | 10/1997 | Kahre ...................................... | 370/210 |
| 5,691,995 | 11/1997 | Ikeda et al. .............................. | 348/77 |

Primary Examiner—Chau Nguyen
Assistant Examiner—Kenneth Vanderpuye
Attorney, Agent, or Firm—Jay H. Maoili

[57] ABSTRACT

A multiple access transmitting method in communication resources using a multicarrier signal in which subcarriers of a predetermined number are allocated with a predetermined frequency separation, includes a coding processing step of processing a plurality of individual signals generated from a plurality of signal sources, respectively, a multiplexing step of multiplexing output signals obtained in the coding processing step, and a converting step of converting an output signal obtained in the multiplexing step into a multicarrier signal. A multiple access receiving method in communication resources using a multicarrier signal in which subcarriers of a predetermined number are allocated with a predetermined frequency separation, includes a converting step of converting a received multicarrier signal into an information including every subcarrier, a demultiplexing step of demultiplexing output signals obtained in the converting step and of generating plurality of codes, and a coding processing step of processing a plurality of individual signals generated in the demultiplexing step.

20 Claims, 15 Drawing Sheets

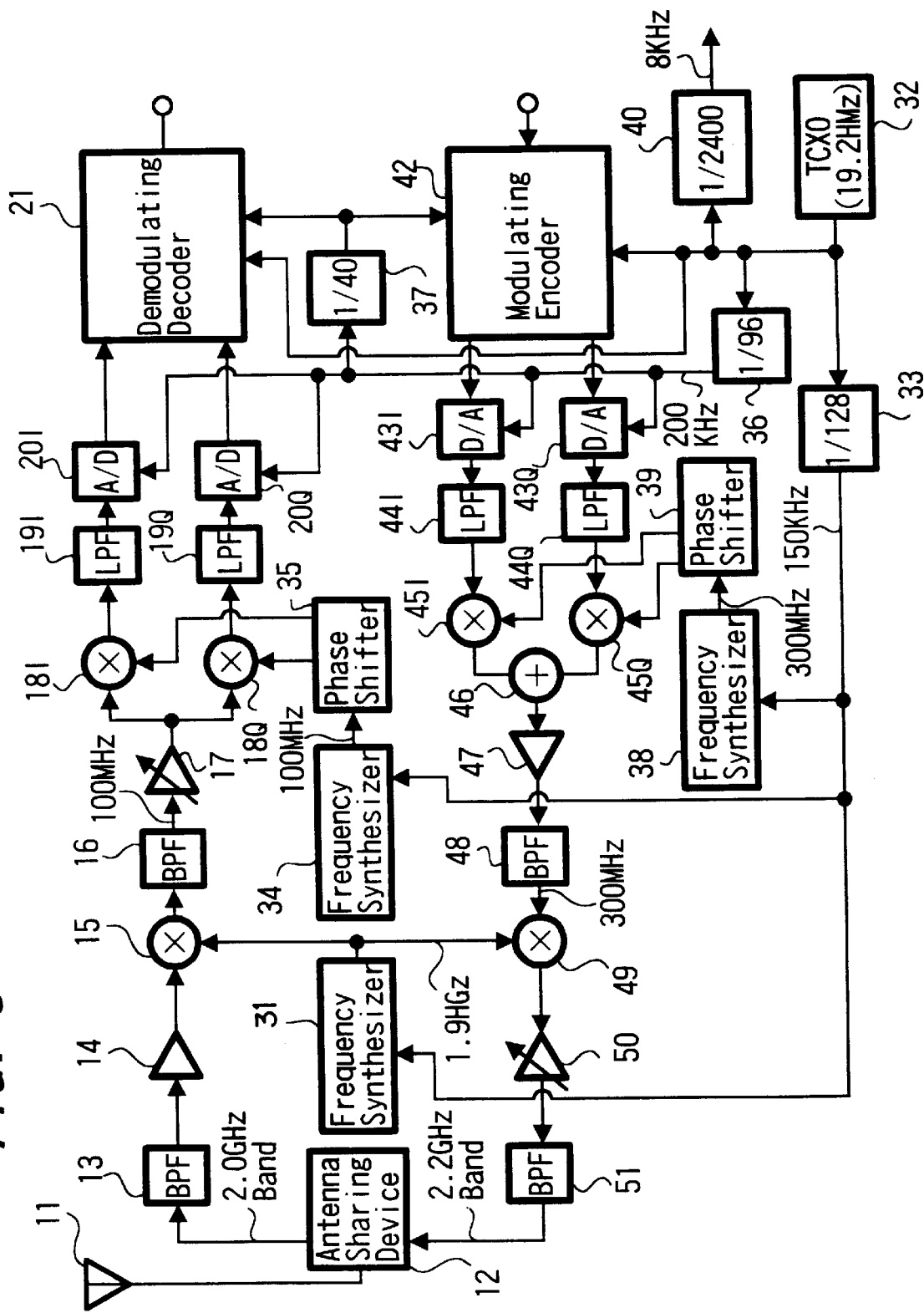

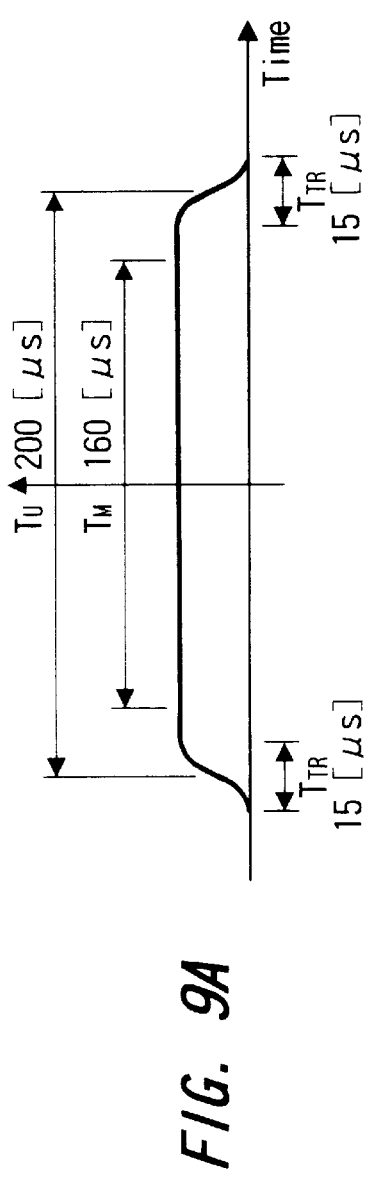
FIG. 9A
FIG. 9B

COMMUNICATIONS METHOD, COMMUNICATION APPARATUS, RECEPTION METHOD, AND RECEPTION APPARATUS

BACKGROUND OF THE INVENTION

1. Field of the Invention

The present invention relates to a communication method, a communication apparatus to which the communication method is applied, a reception method and a reception apparatus therefor which are suitable for application to a radio telephone system, for example.

2. Description of the Related Art

In a mobile communication such as a radio telephone system or the like, a multiple access in which a plurality of mobile stations (terminal apparatus or subscribers) are permitted to access a single base station is employed. In this case of a radio telephone, a number of mobile stations commonly utilize a single base station. Therefore, various communication systems have been proposed for avoiding interference between respective mobile stations. For example, a frequency division multiple access system (FDMA: Frequency Division Multiple Access), a time division multiple access system (TDMA: Time Division Multiple Access), a code division multiple access system (CDMA: Code Division Multiple Access) and so on are conventionally proposed as this kind of communication systems.

Of these systems, the CDMA system is a multiple access system in which a particular code is assigned to each of the mobile stations, a modulated wave of an identical carrier wave (carrier) is spread in spectrum with the code and then transmitted to the identical base station, and a reception side takes code synchronism based on each code to identify a desired mobile station.

Specifically, the base station occupies the whole frequency band owing to the spread spectrum, and transmits signals to respective mobile stations using an identical frequency band at the same time. Each of the mobile stations inversely spreads a signal of a fixed spread band width transmitted from the base station to extract a corresponding signal. Further, the base station discriminates each of the mobile stations by different spread codes to one another.

In the CDMA system, communication can be achieved at every direct calling so long as a code is shared. Further, the system is excellent in secrecy of telephone conversation. Therefore, the system is suitable for a radio transmission utilizing mobile stations such as a portable telephone apparatus and so on.

In the CDMA system, it is difficult to establish a precise communication relationship between mobile stations. Therefore, each communication between respective mobile stations cannot be dealt completely separately, and hence another mobile station can become a source of interference upon communication with a mobile station. Further, data is spread within a particular frequency band in this system. Therefore, it is necessary to define a band width in advance over which the data is spread (i.e., a band width for use of transmission). Therefore, it is difficult to change the transmission band width.

The above matter will be described more concretely. FIGS. 1A and 1B shows a model in which a transmission signal of a particular user is extracted by an inverse spread from transmission signals of stations (users) which are spectrum spread with predetermined codes and multiplexed, for example. As shown in FIG. 1A, if a signal of a user U0 is to be extracted by the inverse spread from signals of eight users U0 to U7 which are multiplexed with codes, then as shown in FIG. 1B, the signal of the user U0 can actually be extracted. However, signals of other users U1 to U7 which are dealt by the same base station also become an interference source, serving as a noise. This fact results in deterioration of an S/N characteristic. For this reason, in a radio transmission employing the CDMA system, electric wave does not reach well due to the deterioration caused by the interference, which in fact narrows a service area. Further, interference due to other users can be suppressed only by an amount of inverse spread gain which is obtained in a process of spectrum inverse spread. Therefore, a number of users (mobile stations) permitted to access is limited and a channel capacity becomes small.

There can be considered a communication system for solving such problems in which a multicarrier signal having a plurality of subcarriers is transmitted as a transmission signal of one system. However, since in a radio telephone system it is necessary for the base station to simultaneously access a plurality of terminal apparatus, if such transmission system using such multicarrier signal is applied thereto, then the base station requires complicated transmission processing systems each for converting a data into a multicarrier signal to then carry out a transmission processing as much as the terminal apparatus which the base station simultaneously access, and also requires complicated reception processing systems each for converting a multicarrier signal subjected to a reception processing into an original data as much as the terminal apparatus which the base station simultaneously access. Hence, an arrangement of the transmission and reception system of the base station disadvantageously becomes complicated.

SUMMARY OF THE INVENTION

In view of such aspects, it is an object of the present invention to enable simultaneous access to be realized with a simple processing when the present invention is applied to a transmission system capable of transmitting data without interference of another data.

According to a first aspect of the present invention, a multiple access transmitting method in communication resources using a multicarrier signal in which subcarriers of a predetermined number are allocated with a predetermined frequency separation, includes a coding processing step of processing a plurality of individual signals generated from a plurality of signal sources, respectively, a multiplexing step of multiplexing output signals obtained in the coding processing steps, and a converting step of converting an output signal obtained in the multiplexing step into a multicarrier signal.

According to a second aspect of the present invention, a multiple access receiving method in communication resources using a multicarrier signal in which subcarriers of a predetermined number are allocated with a predetermined frequency separation, includes a converting step of converting a received multicarrier signal into an information including every subcarrier, a demultiplexing step of demultiplexing output signals obtained in the converting step and of generating plural series of codes, and a coding processing step of processing a plurality of individual signals generated in the demultiplexing step.

According to a third aspect of the present invention, a multiple access transmitting apparatus in communication resources using a multicarrier signal in which subcarriers of a predetermined number are allocated with a predetermined frequency separation, includes a coding processing means for processing a plurality of individual signals generated from a plurality of signal sources, respectively, a multiplexing means for multiplexing output signals generated from the coding processing means, and a converting means for converting an output signal from the multiplexing means into a multicarrier signal.

According to a fourth aspect of the present invention, a multiple access receiving apparatus in communication resources using a multicarrier signal in which subcarriers of a predetermined number are allocated with a predetermined frequency separation, includes a converting means for converting a received multicarrier signal into an information including every subcarrier, a demultiplexing means for demultiplexing output signals from the converting means and for generating plural series of codes, and a coding processing means for processing a plurality of individual signals generated from the demultiplexing means.

BRIEF DESCRIPTION OF THE DRAWINGS

FIG. 6 is a block diagram showing an arrangement of a terminal apparatus according to an embodiment of the present invention;

FIGS. 9A and 9B are diagrams showing examples of waveforms of a windowing data according to the embodiment;

DESCRIPTION OF THE PREFERRED EMBODIMENTS

A communication method and a communication apparatus according to an embodiment of the present invention will hereinafter be described with reference to FIG. 2 to FIG. 16.

Initially, an arrangement of a communication system to which the present embodiment is applied will be described. The communication system of the present embodiment is arranged as a so-called multicarrier system in which a plurality of subcarriers are continuously disposed within a band allocated in advance, and the plurality of subcarriers within the single band are utilized on a single transmission path at the same time. Further, the plurality of subcarriers within the single band are collectively divided in the band to be modulated. Here, this system is called a band division multiple access (BDMA: Band Division Multiple Access).

Figure 1A:
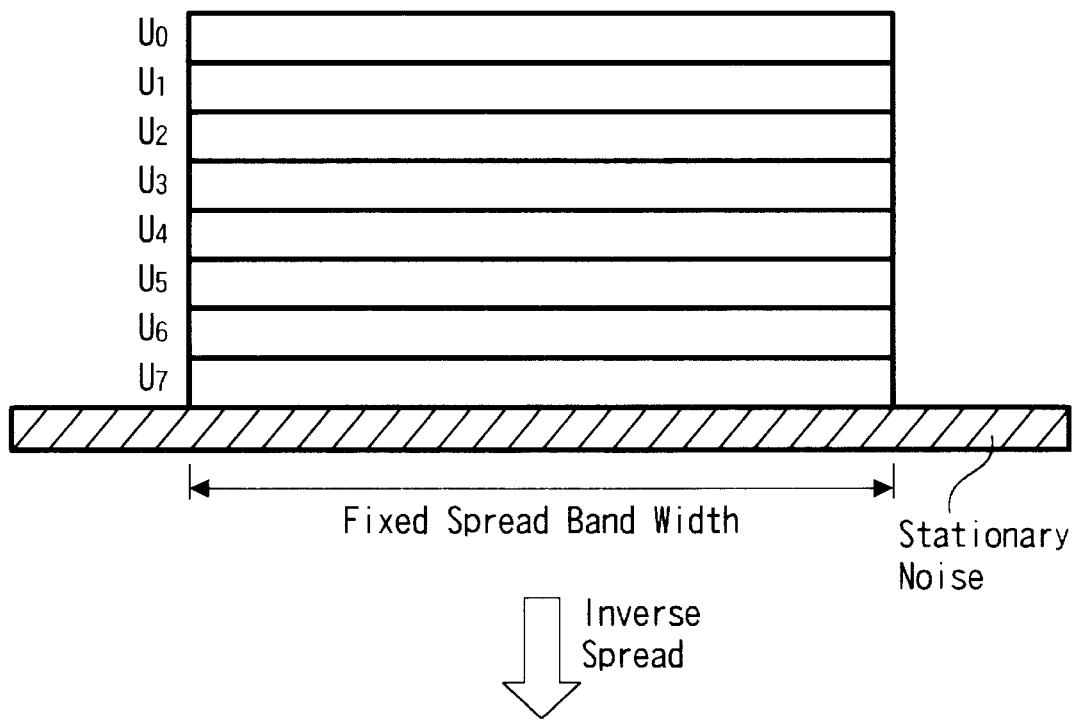
FIGS. 1A and 1B are diagrams each used to explain an interference state in a CDMA system.
Figure 1B:
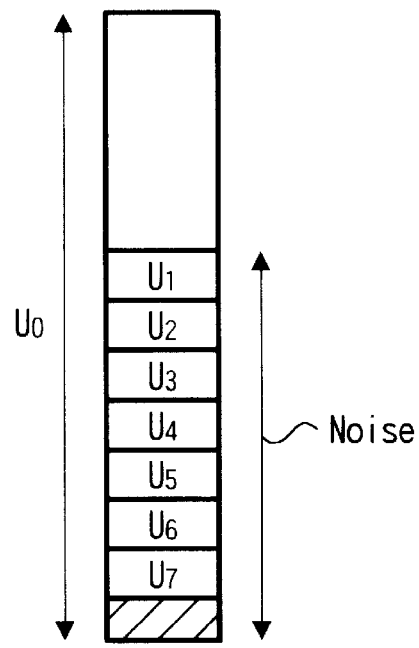
Figure 2:
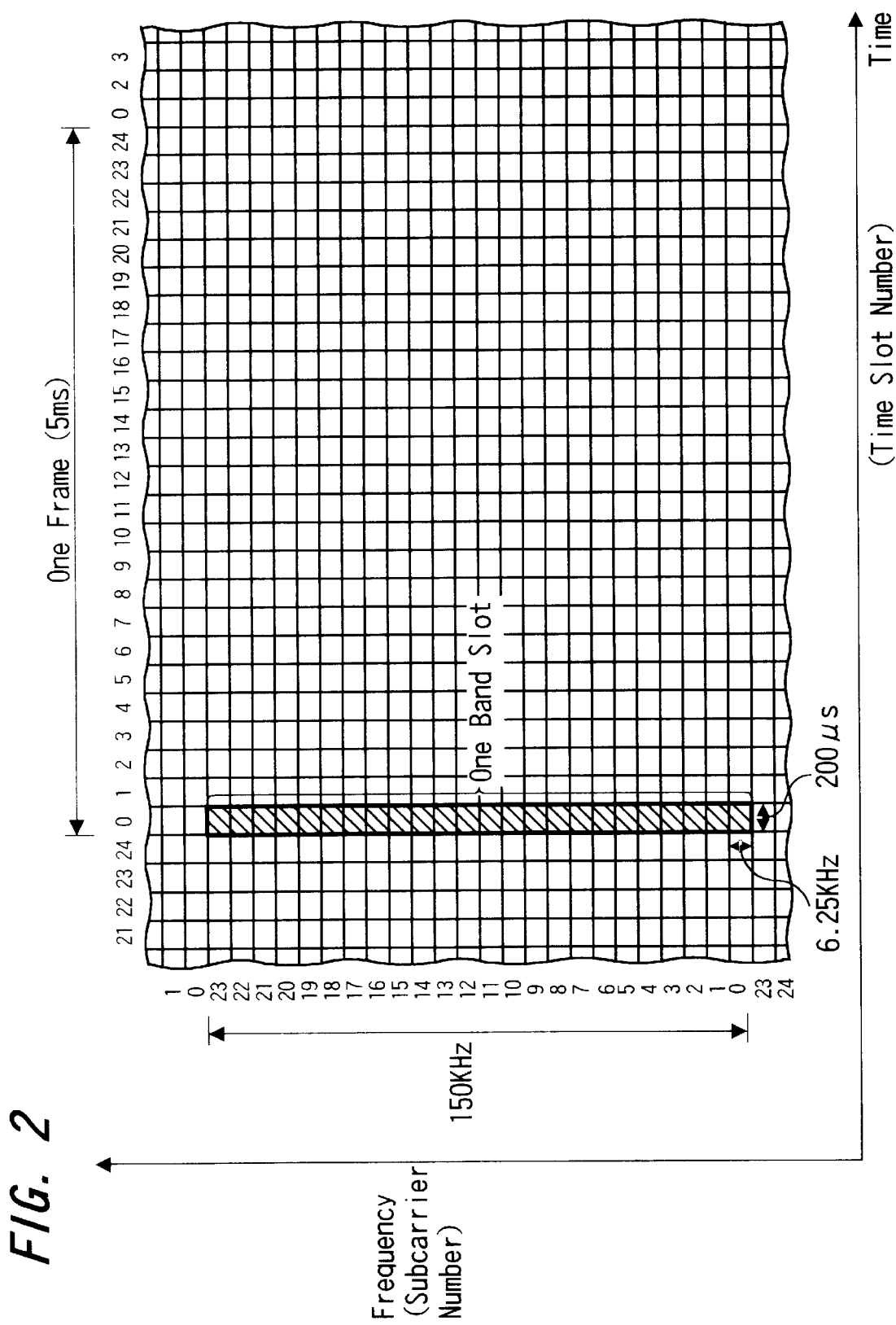
FIG. 2 is a diagram used to explain a slot arrangement of a transmission signal used in a communication apparatus according to an embodiment of the present invention.
Figure 3:
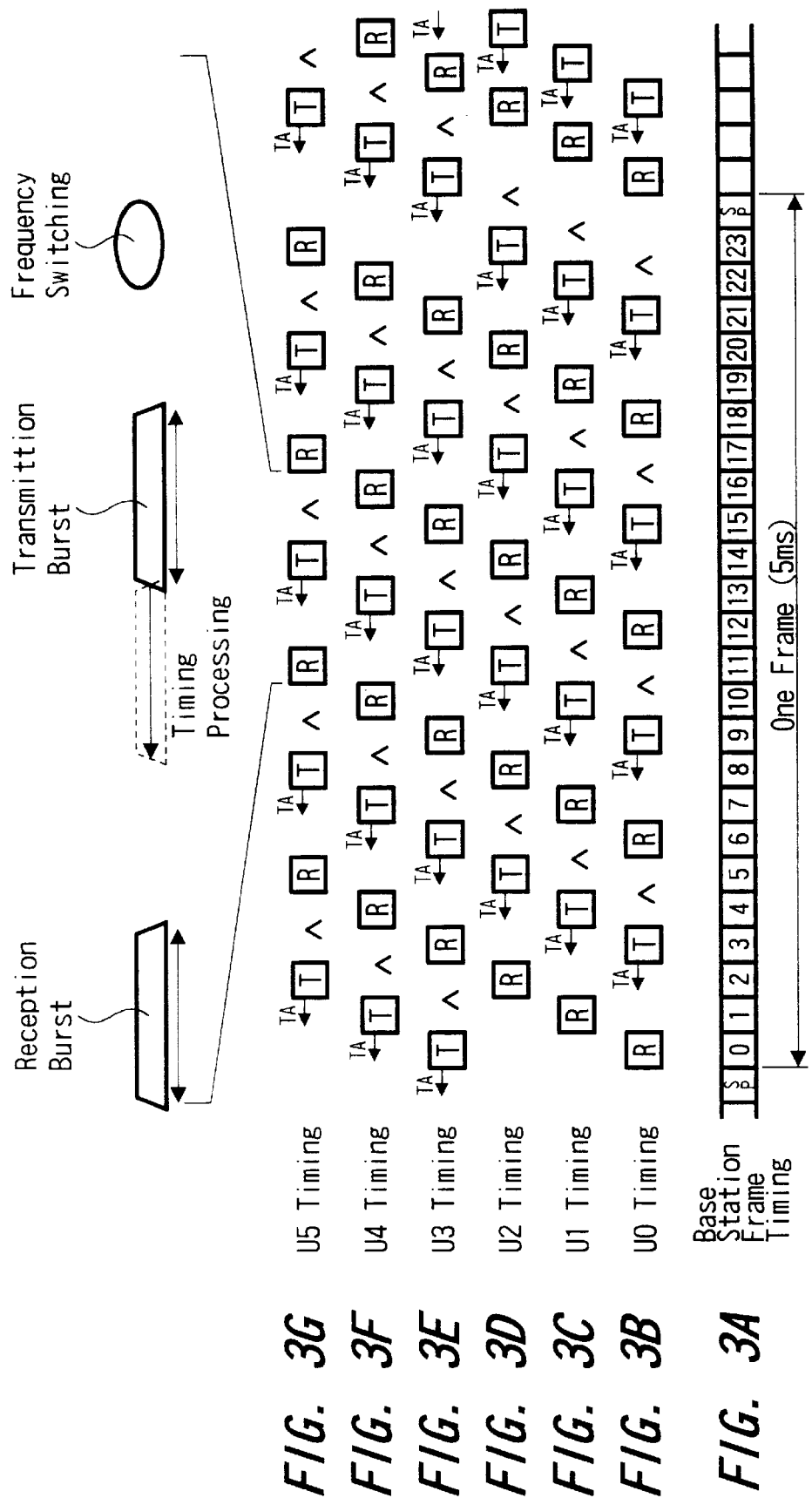
FIGS. 3A to 3G are diagrams each used to explain a transmission state in a frame according to the embodiment.

The arrangement thereof will be described below. FIG. 2 is a diagram showing a slot arrangement of transmission signals of the present embodiment in which a frequency is set in the ordinate thereof and a time is expressed on the abscissa thereof. In the present example, the frequency-axis and the time-axis are divided in a lattice fashion to provide an orthogonal base system. Specifically, the transmission band width of one transmission band (one band slot) is set to 150 KHz and the one transmission band of the 150 KHz includes therein 24 subcarriers. The 24 subcarriers are disposed continuously with an equal interval of 6.25 KHz, and every carrier is assigned with a subcarrier number from 0 to 23. However, practically existing subcarriers are allocated to bands of subcarrier numbers of 1 to 22. Bands of both end portions of the one band slot, i.e., bands of subcarrier numbers of 0 and 23 are assigned with no subcarrier, i.e., they are made to serve as a guard band and their electric power is set to zero.

One time slot is regulated at an interval of 200 $\mu$sec. in terms of the time-axis. A burst signal is modulated and transmitted together with 22 subcarriers at every time slot. One frame is defined as an array of 25 time slots (i.e., 5 msec.). Each of the time slots within one frame is assigned with a time slot number from 0 to 24. A hatched area in FIG. 2 represents a section of one time slot in one band slot. In this case, a time slot assigned with a slot number of 24 is a period in which no data is transmitted.

Multiple access in which a plurality of mobile stations (terminal apparatus) carry out communication with a base station at the same period, is carried out by using the orthogonal base system which derives from dividing the frequency-axis and time-axis in a lattice fashion. Connection condition with respective mobile stations is arranged as shown in FIGS. 3A to 3G. FIGS. 3A to 3G are diagrams each showing an operation condition indicating that how six mobile stations are connected to the base station by using time slots U0, U1, U2, . . . , U5 with one band slot (actually utilized band slot is changed owing to a frequency hopping which will be described later). A time slot represented by R is a reception slot while a time slot represented by T is a transmission slot. As shown in FIG. 3A, a frame timing regulated in the base station is set to a period including 24 time slots (of the 25 time slots, the last slot, i.e, a slot of number 24 is not utilized). In this case, the transmission slot is transmitted using a band different from one of the reception slot.

The mobile station U0 shown in FIG. 3B uses time slots of time slot numbers, 0, 6, 12, 18 within one frame as a reception slot, while time slots of time slot numbers, 3, 9, 15, 21 as a transmission slot. A burst signal is received or transmitted in each time slot. The mobile station U1 shown in FIG. 3C uses time slots of time slot numbers, 1, 7, 13, 19 within one frame as a reception slot, while time slots of time slot numbers, 4, 10, 16, 22 as a transmission slot. The mobile station U2 shown in FIG. 3D uses time slots of time slot numbers, 2, 8, 14, 20 within one frame as a reception slot, while time slots of time slot numbers, 5, 11, 17, 23 as a transmission slot. The mobile station U3 shown in FIG. 3E uses time slots of time slot numbers, 3, 9, 15, 21 within one frame as a reception slot, while time slots of time slot numbers, 0, 6, 12, 28 as a transmission slot. The mobile station U4 shown in FIG. 3F uses time slots of time slot numbers, 4, 10, 16, 22 within one frame as a reception slot, while time slots of time slot numbers, 1, 7, 13, 22 as a transmission slot. Further, the mobile station U5 shown in FIG. 3G uses time slots of time slot numbers, 5, 11, 16, 22 within one frame as a reception slot, while time slots of time slot numbers, 2, 8, 14, 20 as a transmission slot.

In this way, 6-TDMA (time division multiple access) in which six mobile stations are connected within one band slot is carried out. Each mobile station has an allowance of two time slot period (i.e., 400 μsec.) from completion of reception and transmission of one time slot period to the next execution of transmission and reception. Each mobile station carries out a timing processing and a processing called a frequency hopping by using the allowance. That is, during about 200 μsec. before each transmission slot T, the mobile station carries out a timing processing TA in which a transmission timing is synchronized with a timing of a signal transmitted from the base station side. After about 200 μsec. when each transmission slot T terminates, a frequency hopping in which a band slot for carrying out signal transmission and reception is changed to another band slot, is carried out. Owing to the frequency hopping, a plurality of band slots prepared in one base station are utilized uniformly by respective mobile stations, for example.

Specifically, a plurality of band slots are allocated to a single base station. In a case of a cellular system in which one base station forms one cell, if a band of 1.2 MHz is allocated to one cell, eight band slots can be allocated to one cell. Similarly, if a band of 2.4 MHz is allocated to one cell, 16 band slots can be allocated to one cell; if a band of 4.8 MHz is allocated to one cell, 32 band slots can be allocated to one cell; and if a band of 9.6 MHz is allocated to one cell, 64 band slots can be allocated to one cell. Then, a frequency switching processing called the frequency hopping is carried out so that a plurality of band slots allocated to one cell are utilized uniformly. In the present example, a plurality of band slots of which frequencies are continuous are allocated to one cell.

Figure 4:
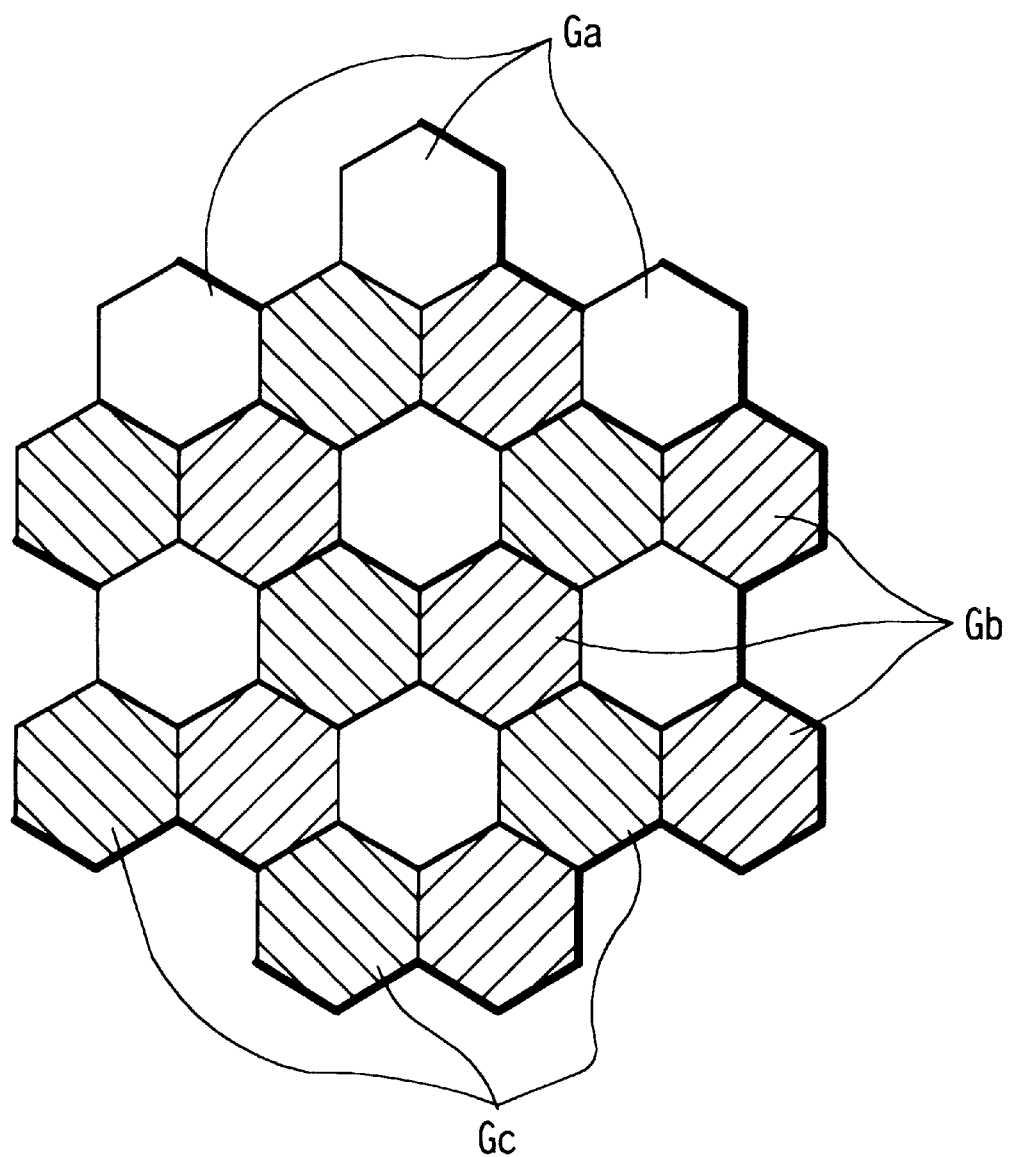
FIG. 4 is a diagram used to explain an example of a cell arrangement according to the embodiment.
Figures 5A, 5B, 5C:
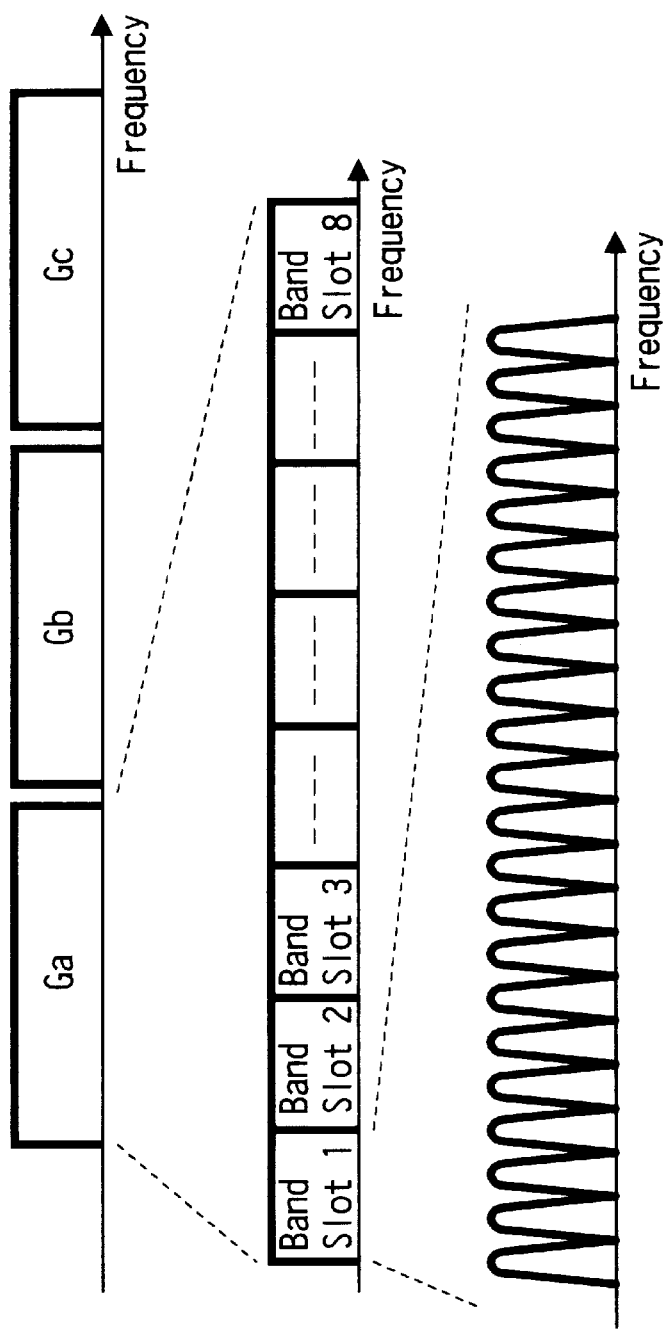
FIGS. 5A to 5C are diagrams each used to explain an example of a band slot arrangement according to the embodiment.

FIG. 4 shows an ideal layout of cells. If cells are arrayed in this manner, three kinds of frequencies are sufficient to allocate to all cells, i.e., a frequency is allocated to cells of a group Ga using a first band, another frequency is allocated to cells of a group Gb using a second band, still another frequency is allocated to cells of a group Gc using a third band. That is, if one cell uses eight band slots, as shown in FIGS. 5A and 5B, continuous eight band slots are prepared for the group Ga, the next continuous eight band slots are prepared for the group Gb and the next continuous eight band slots are prepared for the group Gc. In this case, as shown in FIG. 5C, each band slot includes 22 subcarriers, and a multicarrier transmission is carried out using the plurality of subcarriers at a time. As shown in FIGS. 3A to 3G, communication with a mobile station within the cell is carried out while carrying out the frequency hopping that band slots for multicarrier transmission are changed.

The communication condition is settled as above so that a signal transmitted between each mobile station and the base station is maintained to have orthogonal property with respect to other signals. Therefore, the signal will not suffer from interference from other signals and only a corresponding signal can be extracted satisfactorily. Since a band slot utilized for transmission is changed at any time by the frequency hopping, the transmission bands prepared for each base station is effectively utilized, which leads to effective transmission. In this case, as described above, a frequency band to be allocated to one base station (cell) can be freely settled. Therefore, a system can be freely settled depending on a used situation.

Next, an arrangement of a terminal apparatus (mobile station) which carries out communication with the base station in the above-described system will be described. In this case, a band of 2.0 GHz is utilized as a down-link from the base station to the terminal apparatus while a band of 2.2 GHz is utilized as an up-link from the terminal apparatus to the base station.

FIG. 6 is a diagram showing an arrangement of the terminal apparatus. A reception system thereof will be described first. An antenna 11 serving for transmitting and receiving a signal is connected to an antenna sharing device. The antenna sharing device 12 is connected at its received signal output side with a band-pass filter 13, a reception amplifier 14 and a mixer 15 in series. The band-pass filter 13 extracts a signal of the 2.0 GHz band. The mixer 15 mixes the output from the band-pass filter with a frequency signal of 1.9 GHz output from a frequency synthesizer 31 so that the received signal is converted into an intermediate frequency signal of a 100 MHz band. The frequency synthesizer 31 is formed of a PLL (phase locked loop circuit), and it is a synthesizer for generating signals in a band of 1.9 GHz with an interval of 150 kHz (i.e., one band slot interval) based on a signal of 150 kHz which is generated by frequency-dividing a signal of 19.2 MHz output from a temperature-compensated crystal oscillator (TCXO) 32 by a 1/128 frequency divider 33. Other frequency synthesizers, which will be described later on, utilized in the terminal apparatus are also formed of a PLL circuit.

The intermediate frequency signal output from the mixer 15 is supplied through a band-pass filter 16 and a variable gain amplifier 17 to two mixers 18I, 18Q useful for demodulation. A frequency signal of 100 MHz output from a frequency synthesizer 34 is supplied to a phase shifter 35 in which the signal is made into two system signals of which phases are shifted from each other by 90 degrees. One of the two-system frequency signals is supplied to the mixer 18I while the other of the same is supplied to the mixer 18Q so that they are mixed with the intermediate frequency signal respectively, whereby an I component and a Q component contained in the received data are extracted. The frequency synthesizer 34 is a synthesizer for generating a signal of 100 MHz band based on the signal of 150 kHz generated by frequency-dividing of the 1/128 frequency-divider 33.

Then, the extracted I-component is supplied through a low-pass filter 19I to an analog-to-digital converter 20I in which the component is converted into digital I data. The extracted Q-component is supplied through a low-pass filter 19Q to an analog-to-digital converter 20Q in which the component is converted into digital Q data. In this case, the respective analog-to-digital converters 20I, 20Q use a clock of 200 kHz as a clock for conversion which is generated by dividing a clock of 19.2 MHz output from the TCXO 32 by a 1/96 frequency divider 36.

Then, the digital I data and digital Q data output from the analog-to-digital converters 20I, 20Q are supplied to a demodulating decoder 21 in which demodulated reception data is obtained at a terminal 22. The demodulating decoder 21 is supplied with the clock of 19.2 MHz output from the TCXO 32 as a clock as it is, and also supplied with a clock of 5 kHz generated by frequency-dividing the clock of 200 kHz output from the 1/96 frequency divider 36 by a 1/40 frequency-divider 37. The clock of 5 kHz is utilized for generating slot timing data. Specifically, in the present example, one time slot is set to 200 μsec. as described above. However, a signal of which frequency is 5 kHz has one period of 200 μsec. Thus, slot timing data is generated in synchronism with the signal of 5 kHz.

Next, the transmission system of the terminal apparatus will be described. Transmission data obtained at a terminal 41 is supplied to a modulating encoder 42 in which processing for encoding and modulation is carried out for transmission so as to generate digital I data and digital Q data for transmission. In this case, the modulating encoder 42 is supplied with the clock of 19.2 MHz as a clock which is output from the TCXO 32 as it is, and also supplied with the signal of 5 kHz generated by division with the 1/40 frequency-divider 37 as data for generating a slot timing. The digital I data and the digital Q data output from the modulating encoder 42 are supplied to digital-to-analog converters 43I and 43Q in which the data are converted into an analog I signal and an analog Q signal. The converted I signal and Q signal are supplied through low-pass filters 44I and 44Q to mixers 45I and 45Q. Further, a frequency signal of 300 MHz output from a frequency synthesizer 38 is converted by a phase shifter 39 into two system signals of which phases are shifted from each other by 90 degrees. One of the two system frequency signals is supplied to the mixer 45I while the other of the same is supplied to the mixer 45Q, whereby the frequency signals are mixed with the I signal and the Q signal, respectively, so as to form signals falling in a 300 MHz band. Both of the signals are supplied to an adder 46 in which carried out is an orthogonal modulation to unify them into a single system signal. The frequency synthesizer 38 is a synthesizer for generating a signal of 300 MHz band based on the signal of 150 kHz generated by a frequency-division with the 1/128 frequency-divider 33.

Then, the signal modulated into the signal of 300 MHz band output from the adder 46 is supplied through a transmission amplifier 47 and a band-pass filter 48 to a mixer 49, in which the signal is added with a frequency signal of 1.9 GHz output from the frequency synthesizer 31 so as to convert the signal into a signal of a transmission frequency of 2.2 GHz band. The transmission signal frequency-converted into the transmission frequency is supplied through a transmission amplifier (variable gain amplifier) 50 and a band-pass filter 51 to the antenna sharing device 12 so that the signal is transmitted from the antenna 11 connected to the antenna sharing device 12 in a wireless fashion. A gain of the transmission amplifier 50 is controlled to thereby adjust a transmission output. The control in transmission output is carried out based on output control data received from the base station side, for example.

Further, the signal of 19.2 MHz output from the TCXO 32 is supplied to a 1/2400 frequency-divider 40 to convert be converted into a signal of 8 kHz, and the signal of 8 kHz is supplied to a circuit of a speech processing system (not shown). That is, in the terminal apparatus of the present example, a speech signal transmitted between it and the base station is sampled at a rate of 8 kHz (or oversampling at a rate of an integral multiple of the frequency). Thus, the 1/2400 frequency divider 40 produces a clock necessary for speech data processing circuits such as an analog-to-digital converter and a digital-to-analog converter of a speech signal or a digital signal processor (DSP) for processing for compression and expansion on speech data and so on.

Figure 7:
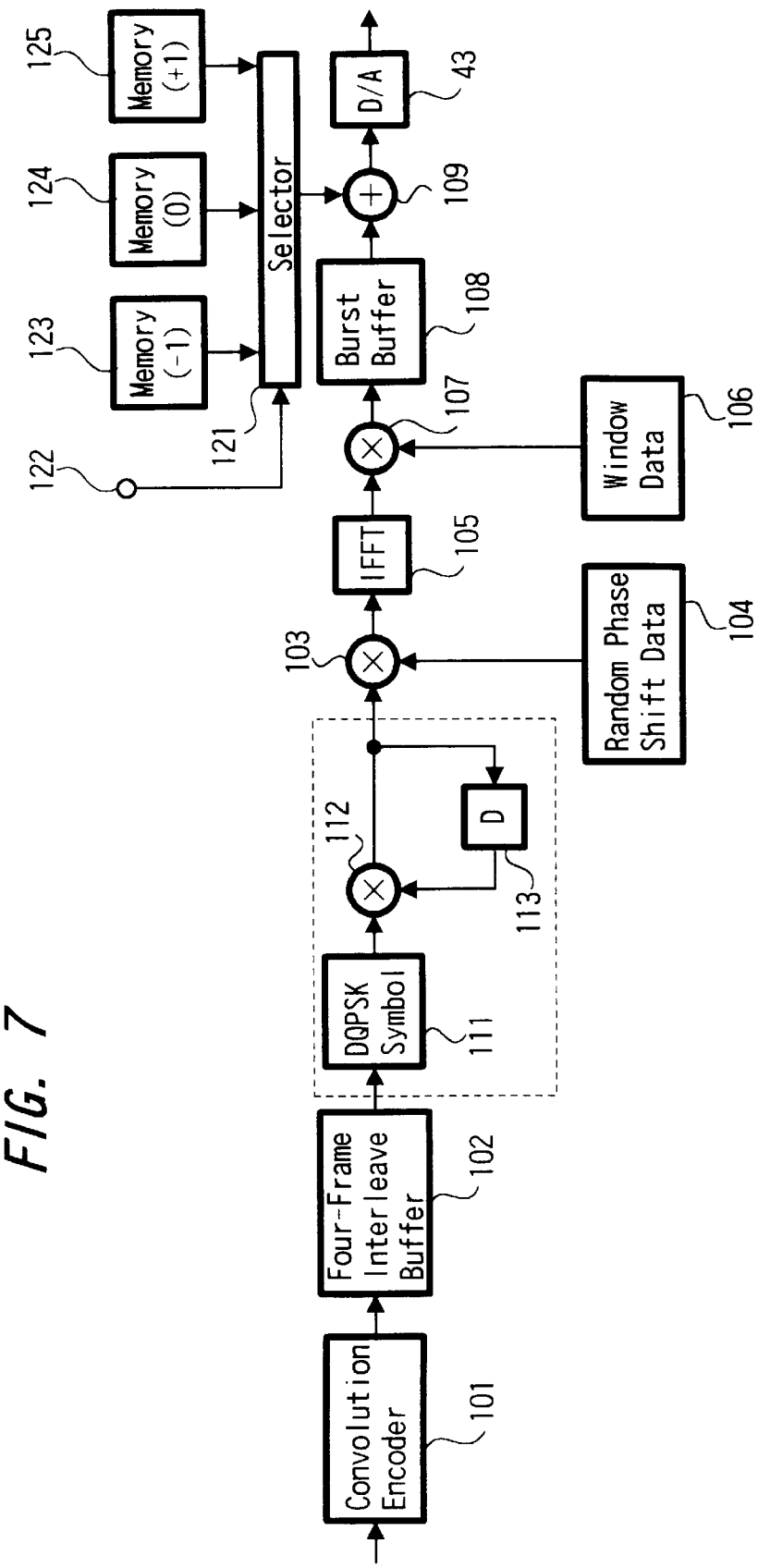
FIG. 7 is a block diagram showing an arrangement of an encoder of the terminal apparatus according to the embodiment.
Figure 8:
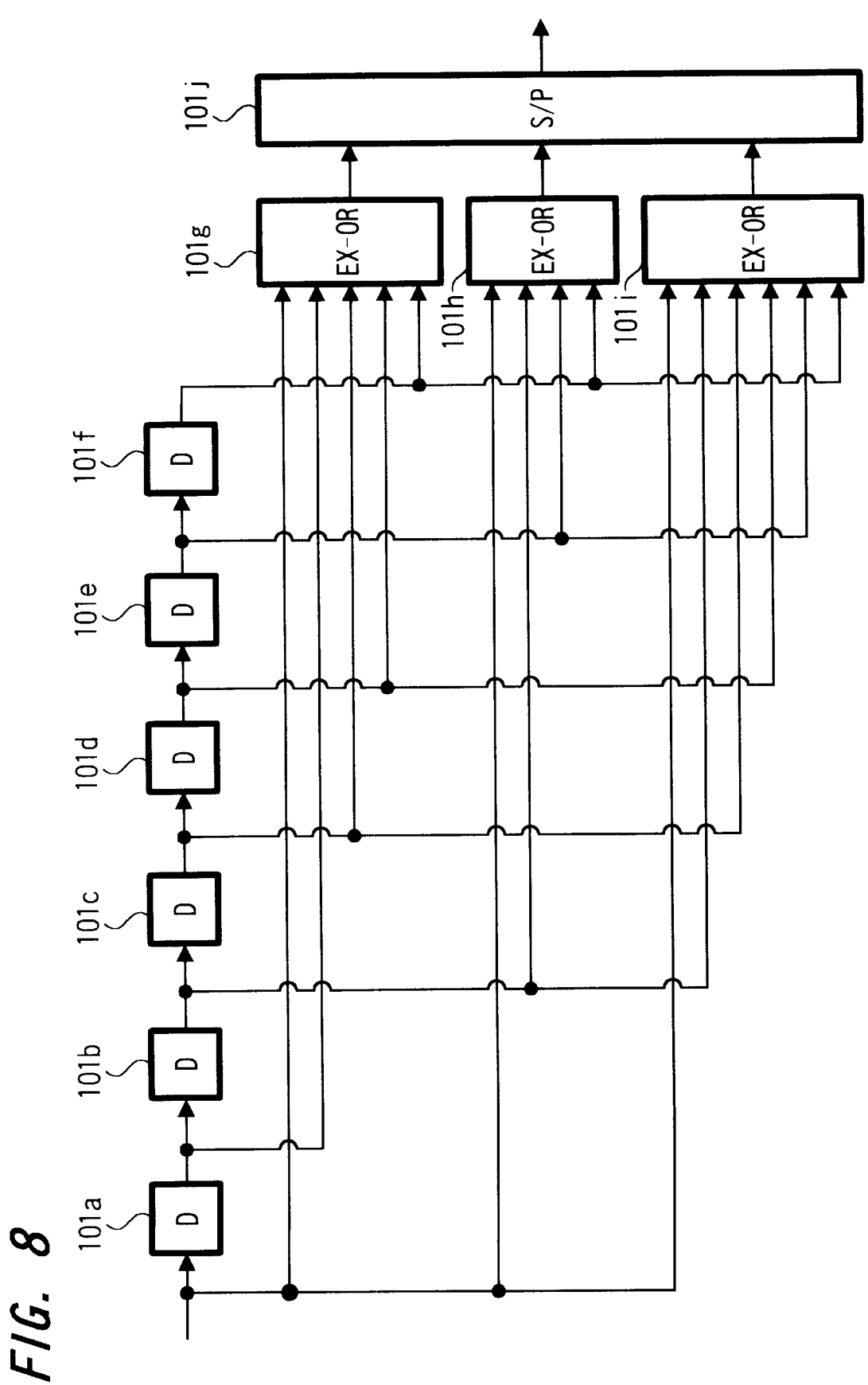
FIG. 8 is a block diagram showing an arrangement of a convolutional encoder of the terminal apparatus according to the embodiment.

Next, the encoder in the transmission system of the terminal apparatus of the arrangement and its peripheral arrangement will be described in detail with reference to FIG. 7. Transmission data is supplied to a convolution encoder 101 in which the data is subjected to convolution encoding. The convolution encoding is carried out with a constrained length of k=7 and a coding rate of R=1/3, for example. FIG. 8 is a diagram showing an arrangement of the convolution encoder with a constrained length of k=7 and a coding rate of R=1/3. Input data is supplied to six delay circuits 101a, 101b, . . . , 101f which are connected in series so that data of continuous 7 bits are made coincident in their timing. Ex-OR gate 101g, 101h, 101i take an exclusive-OR of a predetermined data of the seven bits and outputs of the respective Ex-OR gates 101g, 101h, 101i are converted into parallel data by a serial-to-parallel converting circuit 101j, whereby convolution-encoded data is obtained.

FIG. 7 is again described. An output of the convolution encoder 101 is supplied to a four-frame interleave buffer 102 in which data interleave is carried out over four frames (20 msec.). An output of the interleave buffer 102 is supplied to a DQPSK encoder 110 in which a DQPSK modulation is carried out. That is, a DQPSK symbol generating circuit 111 generates a corresponding symbol based on supplied data, and then the symbol is supplied to a multiplier 112 at one input terminal thereof. A delay circuit 113 delays a multiplied output of the multiplier 112 by one symbol amount and returns it to the other input terminal thereof, whereby the DQPSK modulation is carried out. The DQPSK modulated data is supplied to a multiplier 103 so that random phase shift data output from a random phase shift data generating circuit 104 is multiplied with the modulated data, whereby phase of the data is apparently changed at random.

An output of the multiplier 103 is supplied to an IFFT circuit (inverse fast Fourier transformation circuit) 105 in which a conversion processing to a time axis is carried out on the data of the frequency axis by calculation of the inverse fast Fourier transformation, whereby data on the real time axis of the multicarrier signal of 22 subcarriers with an interval of 6.25 kHz is produced. The IFFT circuit 105 for carrying out the inverse fast Fourier transformation enables an arrangement for generating subcarriers of a second powered number relatively easily. The IFFT circuit 105 employed in the present example is capable of generating $2^5$ subcarriers, i.e., 32 subcarriers and outputs data modulated into continuous 22 subcarriers of the generated subcarriers. The modulation rate of transmission data dealt by the FFT circuit 105 of the present example is set to 200 kHz. A signal of a modulation rate of 200 kHz is converted into 32 multicarriers to produce multicarrier signals with an interval of 6.25 kHz, which numeral derives from calculation of 200 kHz ÷32=6.25 kHz.

The multicarrier data transformed into data of the real time by the inverse fast Fourier transformation is supplied to a multiplier 107 in which the data is multiplied with a time waveform output from a windowing data generating circuit 106. The time waveform is a waveform having one waveform length $T_u$, or about 200 μsec. (that is, one time slot period) as shown in FIG. 9A, for example, on the transmission side. However, the waveform is arranged to have its both end portions $T_{TR}$ (about 15 μsec.) changing gently in its waveform level. Hence, the neighboring time waveforms are arranged to overlap partly on each other as shown at FIG. 9B when the time waveform is utilized for multiplication.

FIG. 7 is again described. The signal multiplied with the time waveform by the multiplier 107 is supplied through a burst buffer 108 to an adder 109. The adder 109 adds control data output from a control data selector 121 to the signal at a predetermined position. The control data utilized for addition is control data indicating control of transmission output. Based on a result of determination over the condition of the received signal at a terminal 122, the selector 121 sets the control data.

In this case, the selector 121 is connected with three control data memories 123, 124, 125 (actually, these memories may be provided by dividing an area of one memory into three portions). Control data for decreasing a transmission output (−1 data) is stored in the memory 123, control data for keeping the transmission output in an unchanged state (±0 data) is stored in the memory 124, and control data for increasing the transmission output (+1 data) is stored in the memory 125, respectively. The control data stored in this case is data equivalent to data when the corresponding control data is subjected to the modulation processing for transmission in the encoder up to the multiplier 107.

Figure 10:
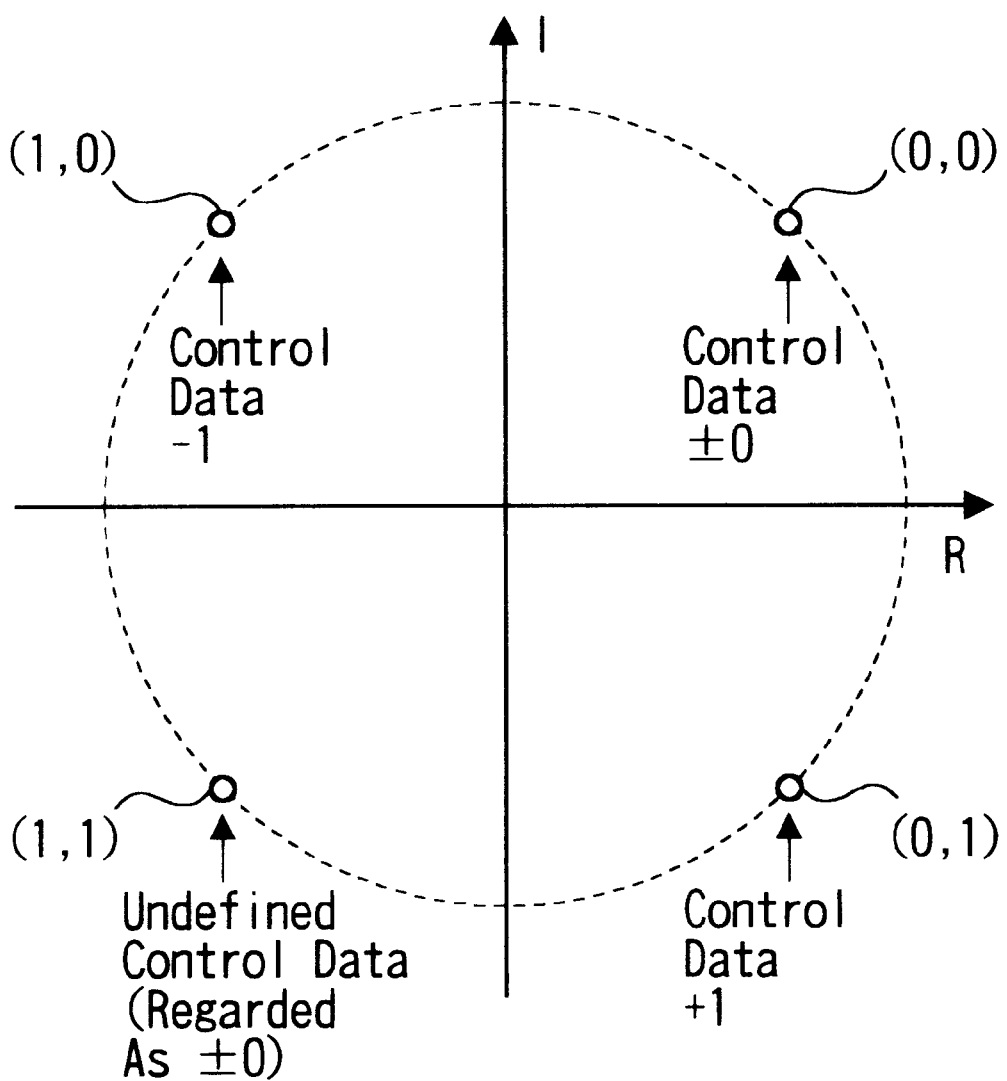
FIG. 10 is a phase characteristic graph showing an example of a transmission data according to the embodiment.

More concretely, the transmission data is a phase-modulated data changing on a plane formed by the I-axis and the Q-axis orthogonal to each other, i.e., the data changing along a circle on a plane shown in FIG. 10. Data (I, Q) at a position of (0, 0) is set to +0 data, that at a position of (1, 0) behind from the position by 90 degrees is set to −1 data and that at a position of (0, 1) ahead of the position of +0 data by 90 degrees is set to +1 data. Control data for the transmission output corresponding to a position of (1, 1) is undefined so that when the reception side discriminates the data of the position, the data is regarded as +0 data to keep the transmission output unchanged. The signal phase shown in FIG. 10 is a phase before being modulated into multicarrier signals. Actually, the data of the signal phase is modulated into multicarrier signal and data generated by being multiplied with a time waveform are stored in respective memories 123, 124, 125.

Transmission data added with the control data by the adder 109 is supplied to a digital-to-analog converter 43 (which corresponds to the digital-to-analog converters 43I, 43Q shown in FIG. 6) in which the transmission data is converted into an analog signal using a clock of 200 kHz for conversion.

Figure 11:
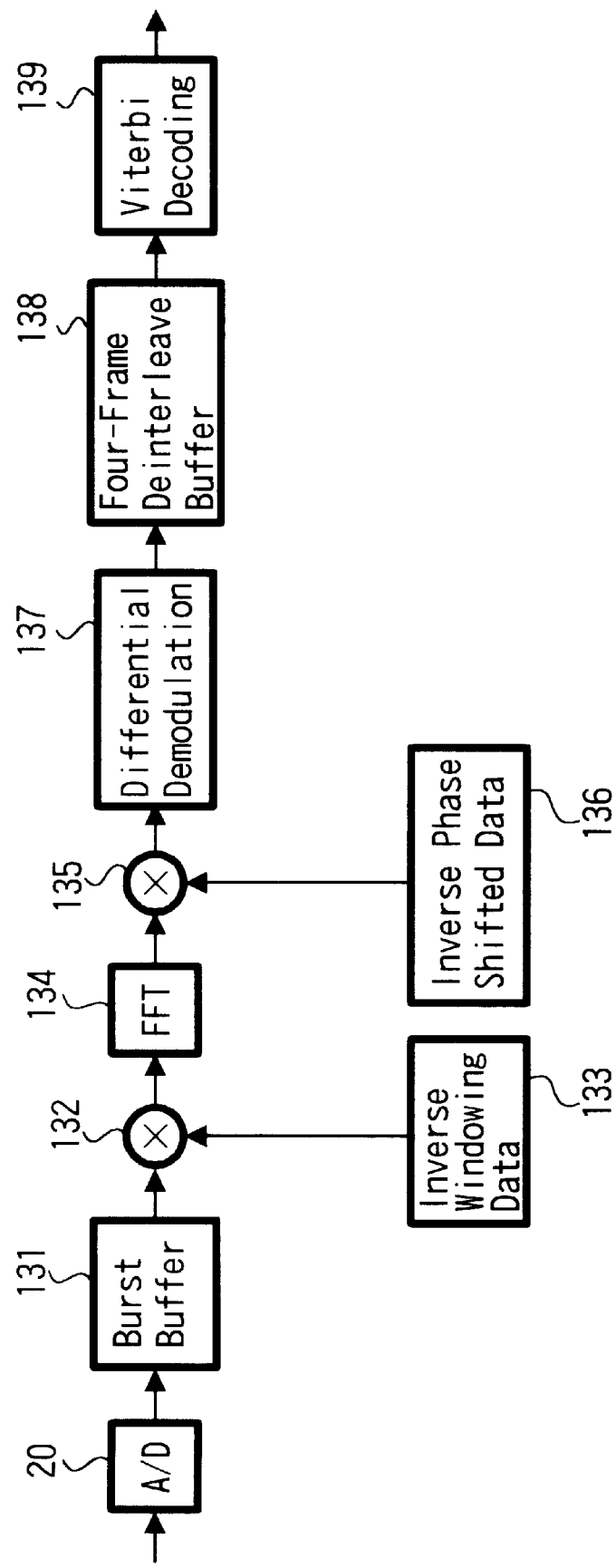
FIG. 11 is a block diagram showing an arrangement of a decoder of the terminal apparatus according to the embodiment.

Next, the decoder and the peripheral arrangement thereof of the reception system of the terminal apparatus of the present example will be described in detail with reference to FIG. 11. Digital data resulting from conversion by an analog-to-digital converter 20 (corresponding to the analog-to-digital converters 20I, 20Q in FIG. 6) using a clock of 200 kHz, is supplied through a burst buffer 131 to a multiplier 132, in which the digital data is multiplied with a time waveform output from an inverse windowing data generating circuit 133. The time waveform utilized for multiplication upon reception is a time waveform with a shape shown in FIG. 9A. This time waveform is arranged to have a length, $T_M$, i.e., 160 μsec. which is shorter than the length of the same upon transmission.

The reception data multiplied with the time waveform is supplied to a FFT circuit 134 in which conversion between a frequency axis and a timebase is carried out by the fast Fourier transformation processing, whereby the transmitted data modulated into 22 subcarriers with an interval of 6.25 kHz and arranged on the time base are separated into information component which each carrier has. The conversion processing in this case is carried out by a circuit capable of processing $2^5$ subcarriers, i.e., 32 subcarriers, similarly to the case in which conversion processing is carried out by the IFFT circuit in the transmission system. Data modulated into continuous 22 subcarriers of them are converted and output therefrom. The modulation rate of transmission data dealt by the FFT circuit 134 of the present example is set to 200 kHz. Since the circuit is capable of processing 32 multicarriers, conversion processing can be carried out on multicarriers with an interval of 6.25 kHz, which numeral derives from calculation of 200 kHz ÷32=6.25 kHz.

The reception data which has been subjected to the fast Fourier transformation in the FFT circuit 134 is supplied to a multiplier 135, in which the reception data is multiplied with inverse random phase shift data (this data is data changing in synchronism with random phase shift data on the transmission side) output from an inverse random phase shift data generating circuit 136, whereby the data is restored to have its original phase.

The data restored to have its original phase is supplied to a differential demodulation circuit 137 in which the data is subjected to differential demodulation. The differentially demodulated data is supplied to a four-frame de-interleave buffer 138 in which data interleaved over four frames upon transmission is restored to have its original data order. The deinterleaved data is supplied to a Viterbi decoder 139 in which the data is Viterbi-decoded. The Viterbi-decoded data is supplied as decoded reception data to a reception data processing circuit (not shown) placed in the later stage.

Figure 12:
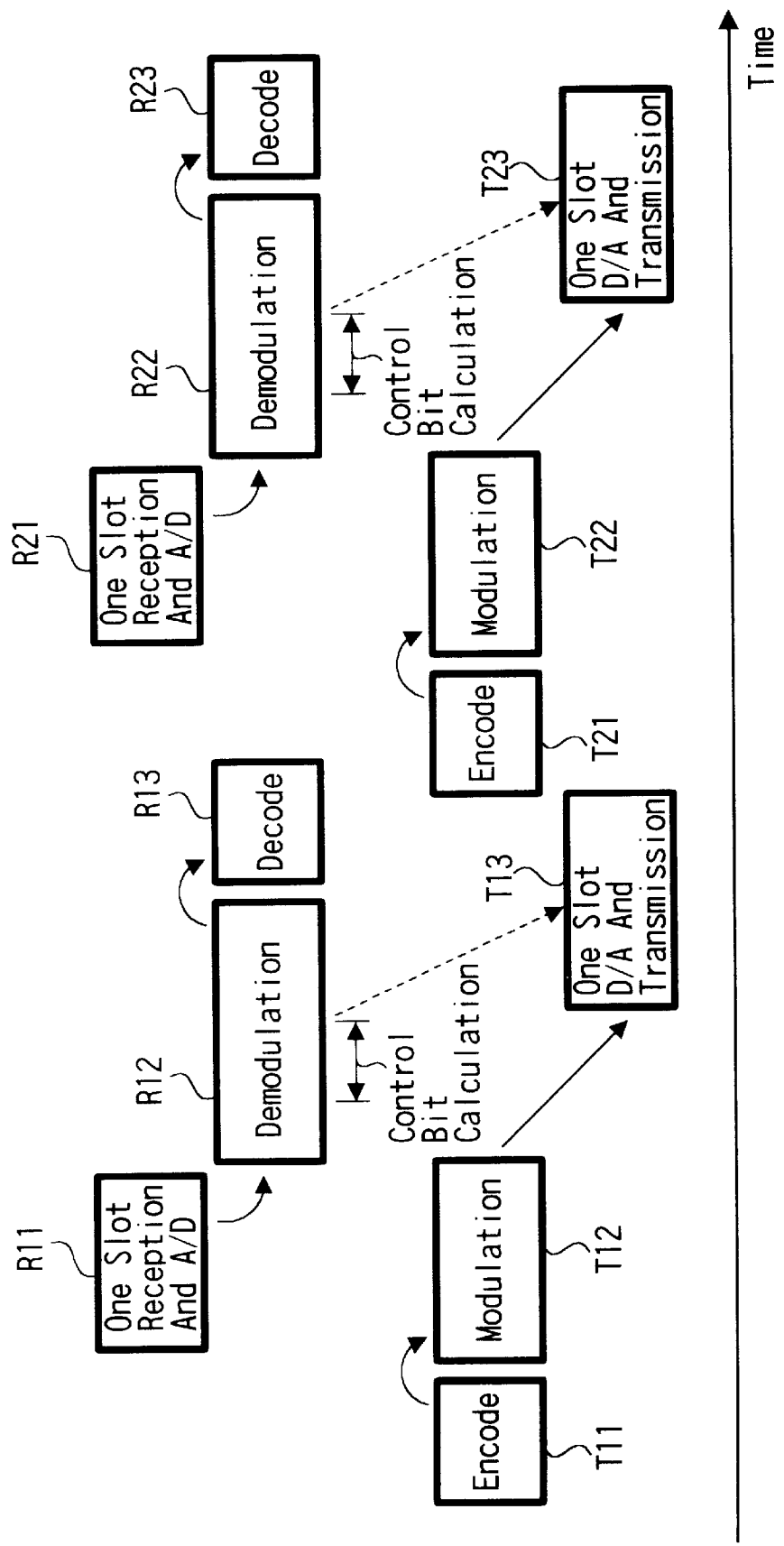
FIG. 12 is a timing chart showing a processing timing according to the embodiment.

FIG. 12 shows timings of processings described so far. Initially, data of one time slot is received at timing R11 in the reception system, and simultaneously with the reception, the received data is converted into digital data by the analog-to-digital converter 20 and then stored in the burst buffer 131. The stored reception data is subjected to demodulation processings such as multiplication with the time waveform, the fast Fourier transform, multiplication with the inverse random phase shift data, differential demodulation, Viterbi demodulation and so on at the next timing R12. Thereafter, decoding is carried out by data processing at the next timing R13.

Then, from timing R21 which is six time slots after timing R11, to timing R23, a processing the same as that of timing R11 to R13 is carried out. Thereafter, the same processing is repeated.

In the transmission system, transmission is carried out at a timing shifted by three time slots with respect to the timing of reception. That is, the transmission data is encoded at predetermined timing T11, the encoded data is subjected to a modulation processing by which the data is converted into transmission data of one burst amount at the next timing T12, and the data is once stored in the burst buffer 108 of the transmission system. Then, at timing T13 behind three time slots from the reception timing R11, the transmission data stored in the burst buffer 108 is converted by the digital-to-analog converter 43 and then subjected to transmission processing and transmitted from the antenna 11. Then, from timing T21, which is six time slots after timing T11, to timing T23 a processing the same as that of timing T11 to T13 is carried out. Thereafter, the same processing is repeated.

In this way, reception processing and transmission processing are carried out intermittently in a time sharing manner. In the present example, control data (control bit) of the transmission output to be added to transmission data is, i.e., the control data of the transmission output upon transmission as described with reference to FIG. 7 is, added by the adder 109 at the last timing when the encode processing is completed for transmission. Therefore, the state of the reception data can be swiftly reflected upon the control data to be transmitted. That is, for example, reception state of the burst signal received at timing R11 is detected at a midst of demodulation at timing R12, and the control state of the transmission output to be notified to the opponent of communication (base station) is determined (i.e., FIG. 12 shows a processing at a timing indicating control bit calculation). When the control bit is calculated, the result of calculation is sent from the terminal 122 to the selector 121, in which the calculation result is added with control data corresponding to transmission data stored in the burst buffer 108, and a burst signal to be transmitted at timing T13 is added with control data of transmission output based on the last received data indicative of the state.

The opponent carrying out communication (base station) determines the control data transmitted at timing T13 so that the opponent controls the transmission output into the corresponding state when the burst signal is transmitted from the base station at the next timing R21. Consequently, the burst signal to be transmitted next is controlled in its transmission output on the basis of the reception state of the burst signal which has been transmitted in the preceding cycle. Thus, the transmission output is positively controlled at every one cycle when the burst signal is transmitted, and hence it is possible to substantially uniform transmission outputs of transmission signals transmitted through a plurality of paths between the terminal apparatus and one base station at the same time.

If there is not carried out the processing that, as in the present example, the control data of the transmission output is prepared in the memory in advance to carry out adding processing, then the following consequence will happen in the example of FIG. 12, for example. That is, a result received at timing R11 is determined in the process of demodulation at timing R12, thereafter the control data is encoded at timing T21 and modulated at timing T22, and the control data based on the reception result at timing R11 is transmitted in response to the burst signal transmitted at timing T23. Thus, it is impossible to control the transmission output at every cycle. While description has been made on a case in which the terminal apparatus side generates data useful for controlling the transmission output from the base station, it is needless to say that the base station side may also generate data useful for controlling the transmission output from the terminal apparatus.

Figure 13:
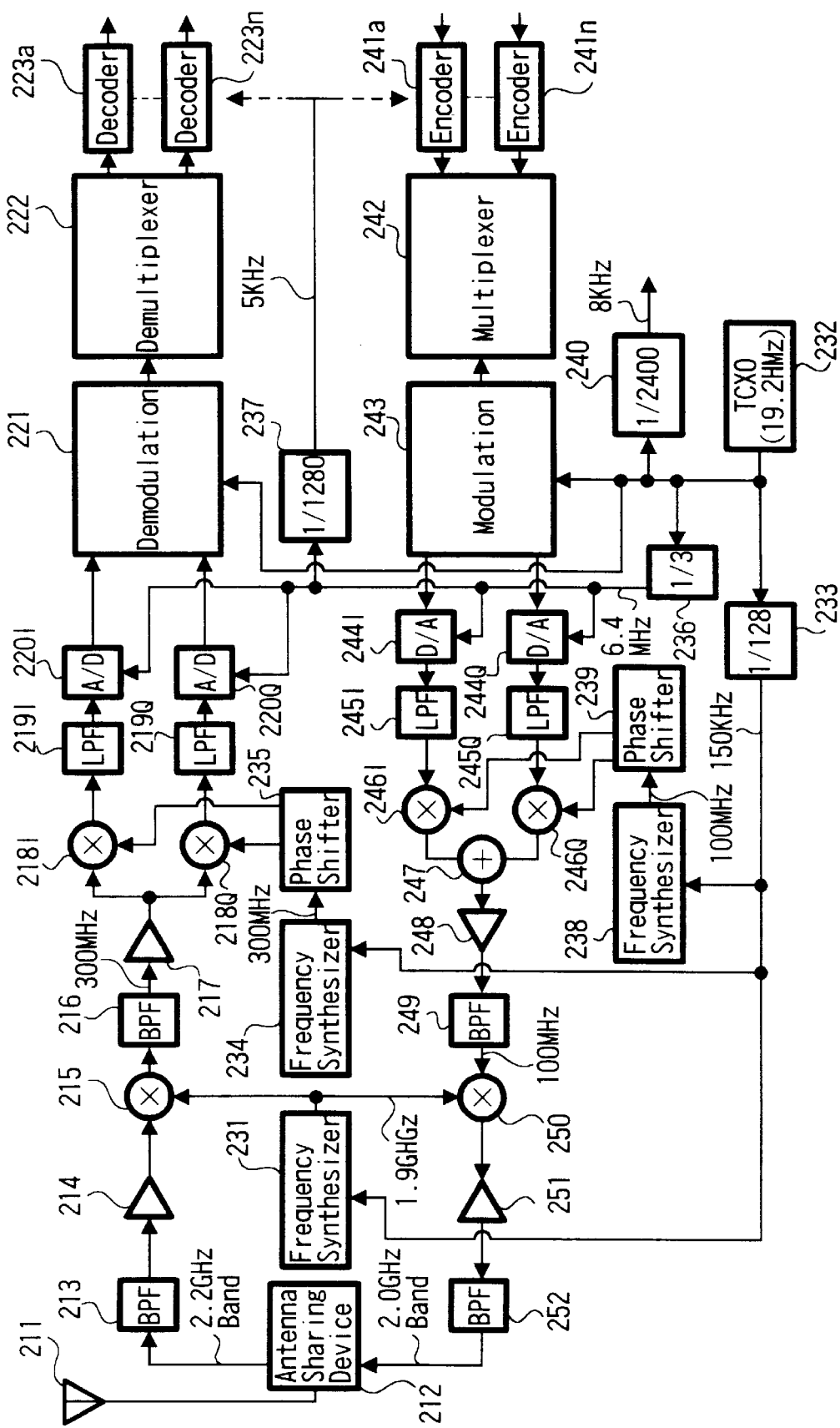
FIG. 13 is a block diagram showing an arrangement of a base station according to the embodiment.

An arrangement of the base station will be described below with reference to FIG. 13. The arrangement of the base station for carrying out transmission and reception is fundamentally the same as the arrangement of the terminal apparatus side. But the base station is different from the terminal apparatus in an arrangement of multiple access which enables a plurality of terminal apparatus to access at a time.

Initially, an arrangement of the reception system shown in FIG. 13 will be described. An antenna 211 serving for transmission and reception is connected to an antenna sharing device 212. The antenna sharing device 212 is connected at its reception signal output side with a band-pass filter 213, a reception amplifier 214 and a mixer 215 in series. The band-pass filter 213 extracts 2.2 GHz band. The mixer 215 mixes an extracted signal with a frequency signal of 1.9 GHz output from a frequency synthesizer 231 so that a reception signal is converted into an intermediate signal of 300 MHz band. The frequency synthesizer 231 is formed of a PLL circuit (phase-locked loop circuit). The frequency synthesizer is a synthesizer for generating signals of 1.9 GHz with an interval of 150 kHz (i.e., one band slot interval) on the basis of a signal of 150 kHz generated by frequency-dividing a signal of 19.2 MHz output from a temperature-compensated crystal oscillator (TCXO) 232 by a 1/128 frequency divider 233. Other synthesizers, which will be described later on, utilized in the base station are similarly formed of the PLL circuit.

The intermediate frequency signal output from the mixer 215 is supplied through a band-pass filter 216 and a reception amplifier 217 to two mixers 218I, 218Q useful for demodulation. A frequency signal of 300 MHz output from a frequency synthesizer 234 is converted into signals of two systems of which phases are shifted from each other by 90 degrees by a phase shifter 235. One of the two system frequency signals is supplied to the mixer 218I while the other of the same is supplied to the mixer 218Q so that they are mixed with the intermediate frequency signals, respectively. Thus, an I-component and a Q-component contained in the received data are extracted. The frequency synthesizer 234 is a synthesizer for generating a signal of 300 MHz band on the basis of a signal of 150 kHz generated by the frequency division with the 1/128 frequency divider 233.

The extracted I-component is supplied through a low-pass filter 219I to an analog-to-digital converter 220I in which the component is converted into digital I data. The extracted Q-component is supplied through a low-pass filter 219Q to an analog-to-digital converter 220Q in which the component is converted into digital Q data. Each of the analog-to-digital converters 220I, 220Q utilizes a signal of 6.4 MHz generated by frequency-dividing a signal of 19.2 MHz output from the TCXO 232 by a 1/3 frequency divider 236 as a clock for conversion.

Then, the digital I data and the digital Q data output from the analog-to-digital converters 220I, 220Q are supplied to a demodulating unit 221 from which demodulated data is supplied to a demultiplexer 222, in which the data supplied thereto is classified into data from respective terminal apparatus and the classified data are supplied separately to decoders 223a, 223b, . . . , 223n of which number corresponds to a number of terminal apparatus permitted to access at a time (six terminals per one band slot). The demodulating unit 221, the demultiplexer 222 and the decoders 223a, 223b, . . . , 223n are supplied with the signal of 19.2 MHz output from the TCXO 32 as a clock as it is, and also supplied with a signal of 5 kHz generated by frequency-dividing a signal of 6,4 MHz output from the 1/3 frequency divider 236 by a frequency divider 237 as slot timing data.

Next, an arrangement of a transmission system of the base station will be described. A multiplexer 242 synthesizes transmission data which are separately encoded by encoders 241a, 241b, . . . , 241n prepared for respective opponents (terminal apparatus) capable of communicating at a time. An output of the multiplexer 242 is supplied to a modulation unit 243 in which modulation processing for transmission is carried out, whereby digital I data and digital Q data for transmission are generated. The respective encoders 241a to 241n, the multiplexer 242 and the modulation unit 243 are directly supplied with the signal of 19.2 MHz output from the TCXO 32 as a clock as it is, and also supplied with the signal of 5 kHz output from the 1/1280 frequency divider 237 as a clock.

The digital I data and the digital Q data output from the modulation unit 243 are supplied to digital-to-analog converters 244I and 244Q in which the digital data are converted into an analog I signal and an analog Q signal. The converted I signal and Q signal are supplied through low-pass filters 245I and 245Q to mixers 246I and 246Q. Further, a frequency signal of 100 MHz output from a frequency synthesizer 238 is converted by a phase shifter 239 into two system signals of which phases are shifted from each other by 90 degrees. One of the two system frequency signals is supplied to the mixer 246I while the other of the same is supplied to the mixer 246Q, whereby the frequency signals are mixed with the I signal and the Q signal, respectively, so as to form signals falling in a 300 MHz band. Both of the signals are supplied to an adder 247 in which carried out is an orthogonal modulation to unify them into a single system signal. The frequency synthesizer 238 is a synthesizer for generating a signal of 100 MHz band based on the signal of 150 kHz generated by a frequency-division with a 1/128 frequency-divider 233.

Then, the signal modulated into the signal of 100 MHz band output from the adder 247 is supplied through a transmission amplifier 248 and a band-pass filter 249 to a mixer 250, in which the signal is added with a frequency signal of 1.9 GHz band output from the frequency synthesizer 231 so as to convert the signal into a signal of a transmission frequency of 2.0 GHz band. The transmission signal frequency-converted into the transmission frequency is supplied through a transmission amplifier 251 and a band-pass filter 252 to the antenna sharing device 212 so that the signal is transmitted from the antenna 211 connected to the antenna sharing device 212 in a wireless fashion.

Further, the signal of 19.2 MHz output from the TCXO 232 is supplied to a 1/2400 frequency-divider 240 to convert the signal into a signal of 8 kHz, and the signal of 8 kHz is supplied to a circuit of a speech processing system (not shown). That is, the base station of the present example is arranged to sample a speech signal, which is transmitted between the terminal apparatus and a base station, at a rate of 8 kHz (or oversampling at a rate of an integral multiple of the rate), and thus the 1/2400 frequency divider 240 produces a clock necessary for speech data processing circuits such as an analog-to-digital converter and a digital-to-analog converter of a speech signal or a digital signal processor (DSP) for processing for compression and expansion on speech data and so on.

Figure 14:
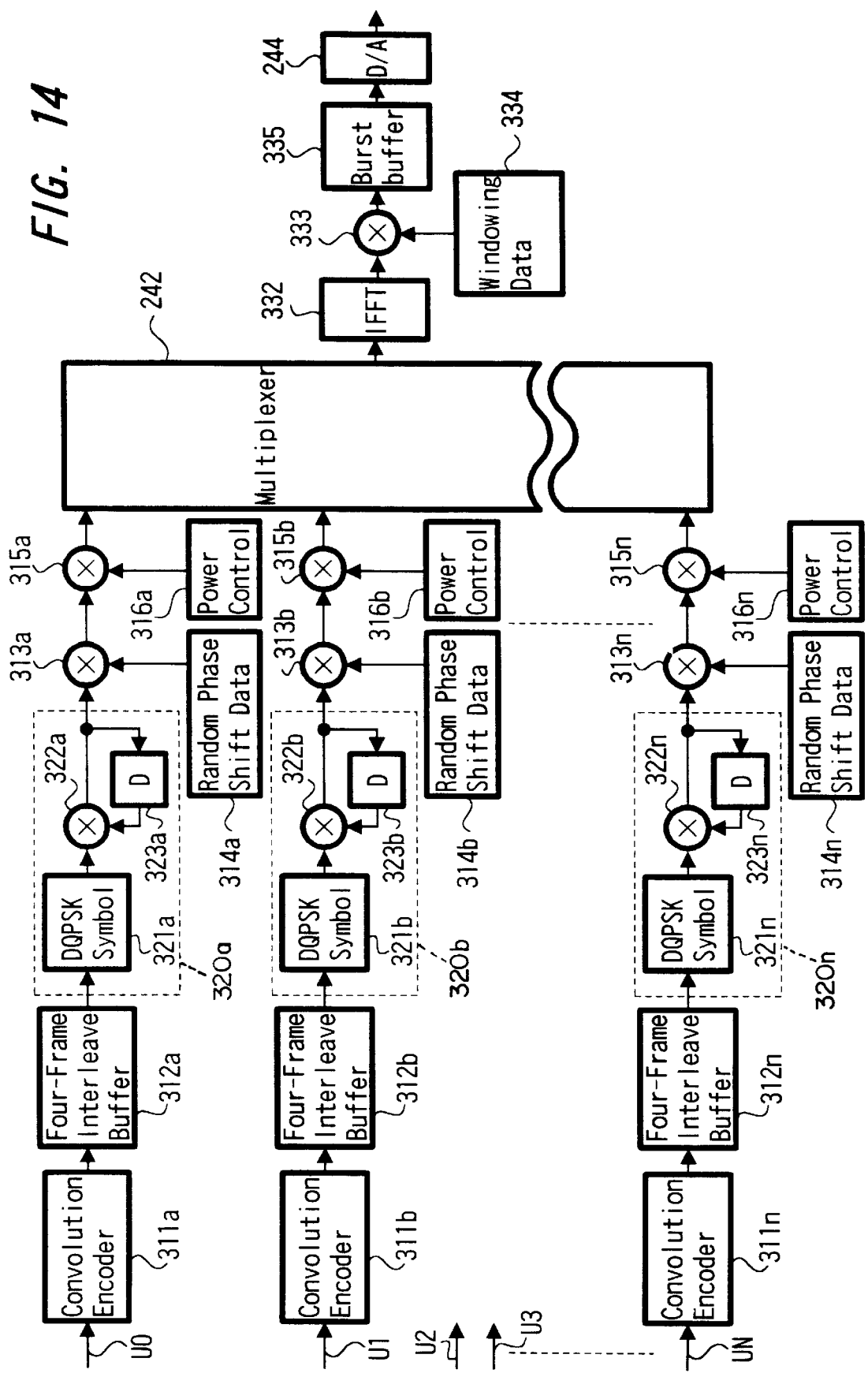
FIG. 14 is a block diagram showing a modulation processing of the base station according to the embodiment.

Next, an arrangement of the base station for encoding and modulating transmission data will be described in detail with reference to FIG. 14. In this case, it is supposed that N (N is an arbitrary number) terminal apparatus (users) carry out multiple access at a time. Thus, transmission signals U0, U1, ..., UN to respective users of the terminal apparatus are supplied to different convolution encoders 311a, 311b, ..., 311n, respectively, in each of which convolution encoding is carried out separately. The convolution encoding is carried out with a constraint length k=7 and a coding rate R=1/3, for example.

Then, data convolution-encoded by respective systems are supplied to four-frame interleave buffers 312a, 312b, ..., 312n, respectively, in each of which interleave is carried out on data over four frames (20 msec.). outputs of respective interleave buffers 312a, 312b, ..., 312n are supplied to DQPSK encoders 320a, 320b, ..., 320n, respectively, in each of which DQPSK modulation is carried out. Specifically, DQPSK symbol generating circuits 321a, 321b, ..., 321n generates corresponding symbols based on the supplied data. The symbols are supplied to one input of multipliers 322a, 322b, ..., 322n, and multiplied outputs of the multipliers 322a, 322b, ..., 322n are supplied to respective delay circuits 323a, 323b, ..., 323n in each of which the symbol is delayed by one symbol amount and fed back to the other input. Thus, DQPSK modulation is carried out. Then, the data subjected to the DQPSK modulation are supplied to the multipliers 313a, 313b, ..., 313n, respectively, in which random phase shift data separately output from random phase shift data generating circuit 315a, 315b, ..., 315n are multiplied with modulation data. Thus, respective data are changed in phase at random apparently.

Outputs of the respective multipliers 313a, 313b, ..., 313n are supplied to other multipliers 315a, 315b, ..., 315n in each of which the output are multiplied with control data output from transmission power control circuits 316a, 316b, ..., 316n provided at every system. Thus, the transmission output is adjusted. This adjustment of transmission output is carried out based on output control data contained in the burst signal transmitted from a terminal apparatus connected to each system. The control data has been described in detail with reference to FIG. 10. That is, if control data of (0, 0) and (1, 1) of (I, Q) data are discriminated from reception data, then the transmission output is maintained as it is, if control data of (0, 1) is discriminated from the reception data, then the transmission output is increased, and if control data of (1, 0) is discriminated from the reception data, then the transmission output is lowered.

The control data of (1, 1) is data which is not actually present on the transmission side. However, when the data of (1, 1) is determined on the reception side, the output is prevented from being changed. Owing to the setting, if the control data of (1, 0) (i.e., data making the output to be lowered) is deviated in phase by 90 degrees due to any cause, and erroneously determined as data of (1, 1) or (0, 0) on the reception side, then it is possible to avoid at least an erroneous processing in the inverse direction which increases the output. Similarly, if the control data of (0, 1) (i.e., data making the output to be increased) is deviated in phase by 90 degrees due to any cause, and erroneously determined as data of (1, 1) or (0, 0) on the reception side, then it is possible to avoid at least an erroneous processing of the output.

The arrangement shown in FIG. 14 will be described again. The transmission data output from the respective multipliers 315a, 315b, ..., 315n are supplied to a multiplexer 242 and then synthesized thereby. When the transmission data are synthesized by the multiplexer 242 according to this embodiment, a frequency at which the transmission data are synthesized can be switched by a unit of 150 kHz. By the switching control, the frequency of the burst signal supplied to each terminal apparatus is switched. Specifically, in this embodiment, as described with reference to FIGS. 3A to 3G and so on, an operation of switching a frequency by a band slot unit which is called a frequency hopping is carried out, and the frequency switching operation is realized by switching processings of the multiplexer 242 upon the synthesizing operation.

The data synthesized by the multiplexer 242 is supplied to an IFFT circuit 332 which carries out the inverse fast Fourier transform for the data, and then obtains a so-called multi-carrier data modulated so as to have twenty two subcarriers having frequencies at every 6.25 kHz per one band slot and converted into the real time. Then, the data converted into the real time signal by the inverse fast Fourier transform is supplied to a multiplier 333 which multiplies it with a time waveform output from a windowing data generating circuit 334. As shown in FIG. 9A, for example, the time wave form is a waveform whose length $T_u$ of one waveform is about 200 $\mu$ second (i.e., one time slot period). However, at each of its both end portions $T_{TR}$ thereof (about 15 $\mu$ second), a level of the waveform is smoothly changed. When the waveform is multiplied with the time wave form as shown in FIG. 9B, adjacent time waveforms are partially overlapped with each other.

Then, the signal multiplied with the time waveform by the multiplier 333 is supplied through a burst buffer 335 to a digital/analog converter 244 (corresponding to the converters 244I, 244Q shown in FIG. 13) which converts it into an analog I signal and an analog Q signal. Then, the analog signals are processed for transmission in the arrangement shown in FIG. 13.

In the base station according to this embodiment, since the band slot switching processing called the frequency hopping is carried out by the multiplexer 242 in the middle of the modulation processing as described above, it is possible to simplify the arrangement of the transmission system. Specifically, when the base station simultaneously handles a plurality of paths of signals as described in this embodiment, it was necessary to convert a frequency of a signal of each of paths into that of a corresponding band slot (channel) to then synthesize the signals, and hence, in the transmission system, a set of the circuits up to the mixer 250 shown in FIG. 13 is required as much as the paths. On the other hand, in the base station of this embodiment, only one system of the circuits is sufficient in the circuits succeeding the multiplexer 242, and hence the arrangement of the base station can be simplified to that extent.

Figure 15:
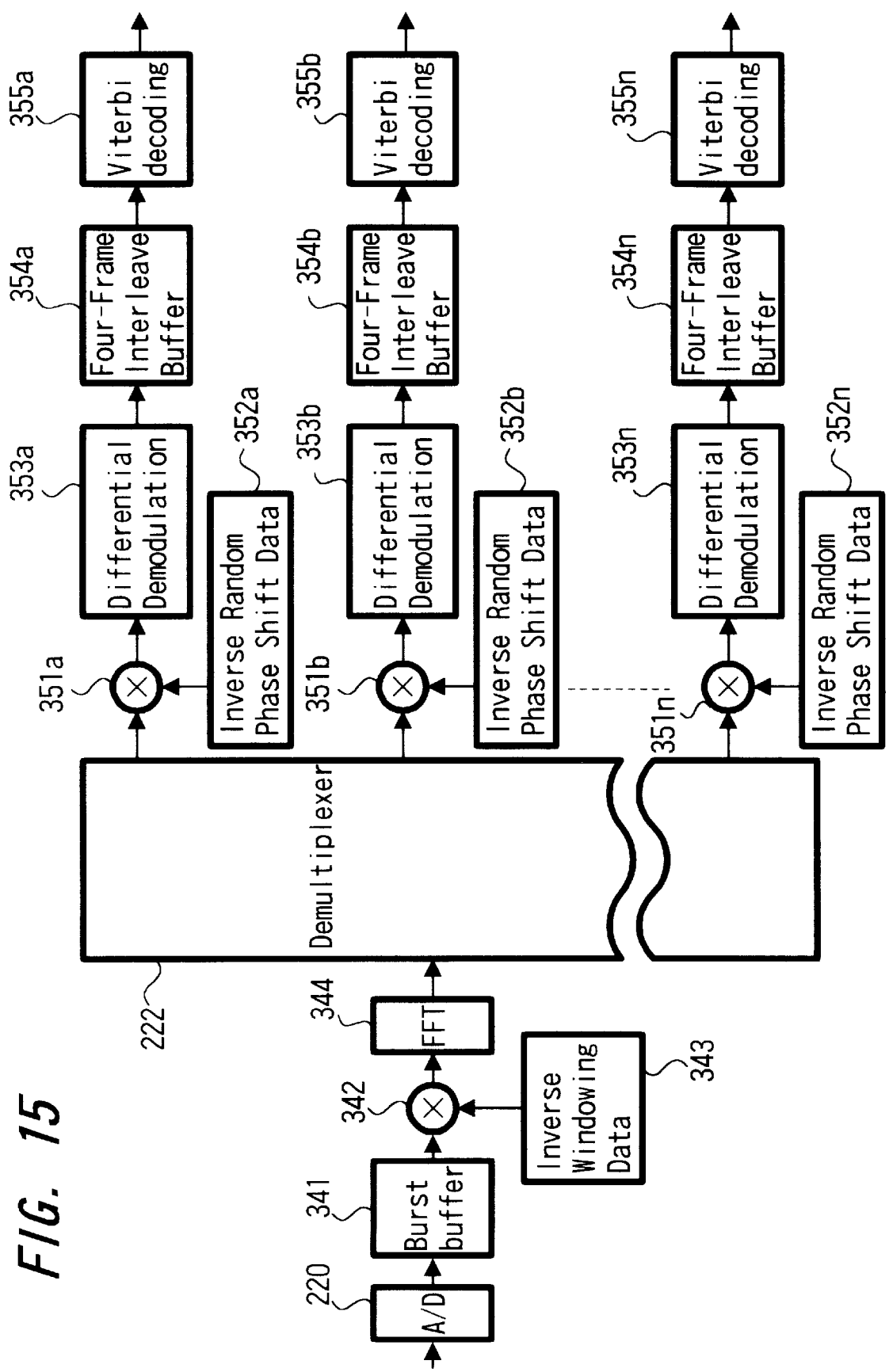
FIG. 15 is a block diagram showing a demodulation processing of the base station according to the embodiment.

An arrangement for demodulating received data in the base station to decode it will be described in detail with reference to FIG. 15. A digital I data and a digital Q data converted by an analog/digital converter 220 (corresponding to the analog/digital converters 220I and 220Q in FIG. 13) are supplied through a burst buffer 341 to a multiplier 342. The multiplier multiplies them with a time waveform output from an inverse windowing data generating circuit 343. The time waveform is a time waveform having a shape shown in FIGS. 9A and 9B and also a time waveform having a length $T_M$ of 160 $\mu$sec which is shorter than that used upon transmission.

The received data multiplied with the time waveform is supplied to a FFT circuit 344 and subjected to fast Fourier transform thereby to carry out a processing converting a frequency axis into a time axis. Thus, each of the data transmitted after modulation in the form of 22 subcarriers at an interval of 6.25 kHz per one band slot is obtained from the real time signal. Then, the data subjected to the fast Fourier transform is supplied to a demultiplexer 222 and divided into data which is as much as the terminal apparatus permitted in multiple access to the base station simultaneously. When the data is divided by the demultiplexer 222 according to this embodiment, the frequency used for the above division is switched by a unit of 150 kHz and this switching operation is controlled, thereby frequencies of the burst signals transmitted from the respective terminal apparatus being switched. Specifically, in this embodiment, as described with reference to FIGS. 3A to 3G and so on, the operation of switching the frequency of a band slot unit which is called the frequency hopping is carried out periodically, and the frequency switching operation carried out on the reception side is realized by time-dividing processings of the demultiplexer 222 upon reception of the received data.

The respective received data divided by the demultiplexer 222 are independently supplied to multiplexers 351a, 351b, . . . , 351n provided so as to be as much as the terminal apparatus of the number N permitted in simultaneous multiple access to the base station. The multipliers 351a, 351b, . . . , 351n respectively multiply the divided data with inverse random phase shift data (data changed in synchronization with the random phase shift data on the transmission side) output from the inverse random phase shift data generating circuits 352a, 352b, . . . , 352n and returns the received divided data to the data having the original phases in the respective systems.

The respective data from the inverse random phase shift data generating circuits are supplied to delay detection circuits 353a, 353b, . . . , 353n and delay-detected (differentially demodulated) thereby. The delay detection circuits supplies the delay detected data to four-frame interleave buffers 354a, 354b, . . . , 354n which restores the data of four frames interleaved upon transmission to the data of the original data arrangement. The four-frame interleave buffers supply the de-interleaved data to Viterbi decoders 355a, 355b, . . . , 355n for subjecting them to Viterbi decoding. The decoders supply the data subjected to the Viterbi decoding as the received data to received-data processing circuits (not shown) at the succeeding stages.

According to the base station of this embodiment, since the data dividing processing including the band slot switching processing called the frequency hopping is carried out by the demultiplexer 222 provided in the middle of the demodulation processing, similarly to the transmission system, it is possible to simplify the arrangement of the reception system. Specifically, when the base station simultaneously handles the signals of plural paths as described in this embodiment, it is necessary in the prior art to convert the frequencies of the signals of the band slots (channels) corresponding to the respective the signals of paths into intermediate frequency signals and then to carry out the processings up to the fast Fourier transform to supply them to the respective multipliers 351a to 351n, and hence in the reception system, sets, which are as much as the number of the paths, of the circuits from the mixer 215 to the demodulating unit 221 shown in FIG. 13 are required. On the other hand, since the base station according to this embodiment requires only one system of the circuits in the transmission system preceding to the demultiplexer 222, it is possible to simplify the arrangement of the base station to that extent.

Values of the frequencies, time, coding rates and so on are described in this embodiment by way of example, and hence the present invention is not limited to the above embodiment. It is needless to say that the present invention can be applied to the modulation processing other than the DQPSK modulation in view of the modulation system.

According to the transmission method of the present invention, it is possible to realize a processing for converting data into the multicarrier signal and a transmission processing for a high-frequency system signal or the like with a processing system of one system and to realize transmission processings carried out in the base station which mobile stations multiple-access with a simple processing.

In this case, upon the mixing, the transmission band is changed by changing a frequency position used for the mixing. Therefore, the processing for changing the frequencies of the respective transmission signals can be carried out with a simple processing.

In the above case, a power control is carried out based on the individual data at levels of symbol system, and the data of symbol system subjected to the power control are mixed. Therefore, it is possible to satisfactorily control powers of the respective signals to be mixed, and it is possible to satisfactorily transmit the respective signals without interference among them.

According to the transmission apparatus of the present invention, it is sufficient to have only one system of the means for converting data into the multicarrier signal and the transmission processing means which are circuits at the succeeding stage of the mixing circuit. Therefore, it is possible to simplify an arrangement of the base station which must simultaneously process the transmission signals of plural systems.

In this case, when the mixer mixes a plurality of data of symbol system, a frequency position used for mixing data is successively changed. Therefore, the device for individually changing the transmission frequency positions of the signals of plural systems is not required, and hence it is possible to simplify the arrangement for changing a frequency.

In the above case, there is provided a multiplying means for multiplying the individual data at levels of symbol system with a power control data, and outputs from the multiplier are mixed by the mixer. Therefore, a signal which is not subjected to the multiplication becomes a satisfactorily power-controlled signal, and hence it is possible to obtain the signal to be transmitted in a satisfactory state with a simple arrangement.

According to the reception method of the present invention, it is possible to realize the reception processing for the high-frequency system signal and the processing for converting the multicarrier signal into the original data with one-system processing system, and hence it is possible to the reception processing carried out in the base station which the mobile stations have multiple-access with a simple processing.

In this case, upon the division, signals individually transmitted with the transmission bands being changed are received by changing a frequency position used for the division. Therefore, it is possible to carry out the processing for changing the frequencies of the respective reception signals with a simple processing.

According to the reception apparatus of the present invention, it is sufficient to have only one system of the reception processor and the device for converting the multicarrier signal into the original data which are circuits at the preceding stage of the mixer.

In this case, in a process for dividing data into individual data of symbol system, the divider successively changes a frequency position used for the division. Therefore, the device for individually changing the reception frequency positions of the signals of plural systems is not required, and hence it is possible to simplify the arrangement for changing the frequency.

Having described a preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A multiple access transmitting method using a multicarrier signal including a plurality of subcarriers of a predetermined number allocated with a predetermined frequency separation, comprising the steps of:
    coding processing a plurality of individual signals generated from a plurality of signal sources, respectively;
    multiplying a plurality of output signals obtained in said coding processing step by random phase shift data;
    converting an output signal obtained in said step of multiplying said plurality of output signals into a multicarrier signal;
    multiplying said multicarrier signal with a time waveform output from a window data generating means and performing a windowing operation; and
    adding control data to said multicarrier signal according to a received signal for controlling a transmission of said multicarrier signal.

2. The multiple access transmitting method according to claim 1, wherein said coding processing step includes a coding step, an interleaving step, and a modulating step.

3. The multiple access transmitting method according to claim 2, wherein said coding step includes convolution coding and said modulating step includes differential quadrature phase shift keying modulation.

4. The multiple access transmitting method according to claim 1, wherein said step of multiplying said plurality of output signals includes generating a signal serving as a multicarrier signal used in every predetermined frequency band for multiple access.

5. The multiple access transmitting method according to claim 1, wherein said converting step includes an inverse Fourier transform.

6. A multiple access receiving method using a multicarrier signal including a plurality of subcarriers of a predetermined number allocated with a predetermined frequency separation, comprising the steps of:
    multiplying a multicarrier signal transmitted from a transmitter with a time waveform output from inverse windowing data generating means and performing a windowing operation, wherein said time waveform has a length shorter than a time waveform generated in said transmitter;
    converting an output signal obtained in said step of multiplying said multicarrier signal into information including each of said plurality of subcarriers;
    multiplying a plurality of output signals obtained in said converting step by inverse random phase shift data and generating a plurality of codes; and
    coding processing a plurality of individual signals generated in said step of multiplying said plurality of output signals, wherein said coding processing calculates control data to be transmitted to said transmitter so that said transmitter controls a transmission output.

7. The multiple access receiving method according to claim 6, wherein said coding processing step includes a demodulating step, a deinterleaving step, and a decoding step.

8. The multiple access receiving method according to claim 7, wherein said demodulating step includes differential demodulating and said decoding step includes Viterbi decoding.

9. The multiple access receiving method according to claim 6, wherein said step of multiplying said plurality of output signals includes signal processing suitable for a multicarrier signal used in every predetermined frequency band for multiple access.

10. The multiple access receiving method according to claim 6, wherein said converting step includes performing a Fourier transform.

11. A multiple access transmitting apparatus using a multicarrier signal including a plurality of subcarriers of a predetermined number allocated with a predetermined frequency separation, comprising:
    coding processing means for processing a plurality of individual signals generated from a plurality of signal sources, respectively;
    first multiplier means for multiplying a plurality of output signals generated from said coding processing means by random phase shift data;
    converting means for converting an output signal from said first multiplying means into a multicarrier signal;
    second multiplier means for multiplying said multicarrier signal output from said converting means with a time waveform output from window data generating means and performing a windowing operation; and adder means for adding control data to said multicarrier signal according to a received signal for controlling a transmission of said multicarrier signal.

12. The multiple access transmitting apparatus according to claim 11, wherein said coding processing means comprises coding means, interleaving means, and modulating means.

13. The multiple access transmitting apparatus according to claim 12, wherein said coding means includes convolution coding and said modulating means includes differential quadrature phase shift keying modulation.

14. The multiple access transmitting apparatus according to claim 11, wherein said first multiplier means includes a signal serving as a multicarrier signal used in every predetermined frequency band for multiple access.

15. The multiple access transmitting apparatus according to claim 11, wherein said converting means includes an inverse Fourier transform.

16. A multiple access receiving apparatus using a multicarrier signal including a plurality of subcarriers of a predetermined number allocated with a predetermined frequency separation, comprising:

first multiplier means for multiplying a multicarrier signal transmitted from a transmitter with a time waveform output from inverse windowing data generating means and performing a windowing operation, wherein said time waveform has a length shorter than a time waveform generated in said transmitter;

converting means for converting a signal output from said first multiplier means into an information signal including each of said plurality of subcarriers;

second multiplier means for multiplying a plurality of output signals from said converting means by inverse random phase shift data and for generating a plurality of codes; and coding processing means for processing a plurality of individual signals generated from said second multiplier means, wherein said coding processing means calculates control data to be transmitted to said transmitter so that said transmitter controls a transmission output.

17. The multiple access receiving apparatus according to claim 16, wherein said coding processing means includes demodulating means, deinterleaving means, and decoding means.

18. The multiple access receiving apparatus according to claim 17, wherein said demodulating means includes differential demodulating and said decoding means includes Viterbi decoding.

19. The multiple access receiving apparatus according to claim 16, wherein said second multiplier means performs a signal processing suitable for a multicarrier signal used in every predetermined frequency band for multiple access.

20. The multiple access receiving apparatus according to claim 16, wherein said converting means performs a Fourier transform.

* * * * *